US010397764B2

(12) United States Patent
Park et al.

(10) Patent No.: US 10,397,764 B2
(45) Date of Patent: Aug. 27, 2019

(54) ELECTRONIC DEVICE AND METHOD OF CONTROLLING WIRELESS COMMUNICATION THEREOF

(71) Applicant: SAMSUNG ELECTRONICS CO., LTD., Suwon-si, Gyeonggi-do (KR)

(72) Inventors: Soon Park, Suwon-si (KR); Kyu-Hyuck Kwak, Suwon-si (KR); Yong-Youn Kim, Anyang-si (KR); Bumjin Cho, Yongin-si (KR); Han-Jib Kim, Suwon-si (KR); Hyo-Seok Na, Yongin-si (KR); Chi-Hyun Cho, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/816,216

(22) Filed: Nov. 17, 2017

(65) Prior Publication Data
US 2018/0199148 A1 Jul. 12, 2018

(30) Foreign Application Priority Data
Jan. 6, 2017 (KR) .......................... 10-2017-0002339

(51) Int. Cl.
H04W 4/80 (2018.01)
H04B 7/04 (2017.01)
(Continued)

(52) U.S. Cl.
CPC ............ *H04W 4/80* (2018.02); *H04B 7/0613* (2013.01); *H04B 7/0825* (2013.01); *H04W 88/06* (2013.01); *H04W 84/12* (2013.01)

(58) Field of Classification Search
CPC ....... H04W 4/80; H04W 88/06; H04W 40/06; H04W 84/12; H04B 7/04; H04B 7/02;
(Continued)

(56) References Cited

U.S. PATENT DOCUMENTS

| 8,359,063 B1* | 1/2013 | Pawar ................. H04W 72/048 455/13.3 |
| 8,780,872 B1 | 7/2014 | Ramamurthy et al. |
| 2006/0160563 A1* | 7/2006 | Ku ........................ H04B 1/406 455/552.1 |

(Continued)

FOREIGN PATENT DOCUMENTS

CN          204334556          5/2015

OTHER PUBLICATIONS

Extended Search Report dated May 11, 2018 in counterpart European Patent Application No. EP17202597.5.
(Continued)

*Primary Examiner* — Andrew Wendell
(74) *Attorney, Agent, or Firm* — Nixon & Vanderhye P.C.

(57) ABSTRACT

Disclosed are an electronic device and a method of controlling wireless communication thereof. The electronic device includes: a first antenna configured to support first short-range wireless communication and second short-range wireless communication; a second antenna; and a processor, wherein the processor is configured to determine information related to occupancy of the first antenna by the first short-range wireless communication or the second short-range wireless communication, to simultaneously or sequentially perform the first short-range wireless communication and the second short-range wireless communication through the first antenna when the information related to the occupancy satisfies a predetermined condition; and to perform one kind of short-range wireless communication selected from the first short-range wireless communication and the second short-range wireless communication through the second antenna and to perform the other kind of short-range wireless communication through the first antenna when the information related to the occupancy satisfies another predetermined condition.

20 Claims, 16 Drawing Sheets

(51) Int. Cl.
*H04B 17/15* (2015.01)
*H04W 88/06* (2009.01)
*H04B 7/06* (2006.01)
*H04B 7/08* (2006.01)
*H04W 84/12* (2009.01)

(58) Field of Classification Search
CPC .. H04B 7/0602; H04B 7/0608; H04B 7/0802; H04B 7/082; H04B 17/15
See application file for complete search history.

(56) References Cited

U.S. PATENT DOCUMENTS

| | | | | |
|---|---|---|---|---|
| 2012/0045012 | A1* | 2/2012 | Alapuranen | H04B 7/04 375/295 |
| 2012/0046000 | A1 | 2/2012 | Gao et al. | |
| 2012/0275319 | A1* | 11/2012 | Peiris | H04M 1/7253 370/252 |
| 2013/0035051 | A1* | 2/2013 | Mujtaba | H04B 7/0808 455/277.2 |
| 2013/0072135 | A1 | 3/2013 | Banerjea et al. | |
| 2013/0163416 | A1* | 6/2013 | Lee | H04W 88/085 370/229 |
| 2013/0225223 | A1* | 8/2013 | Nukala | H04W 52/241 455/522 |
| 2013/0309982 | A1 | 11/2013 | Yan | |
| 2014/0080427 | A1* | 3/2014 | Babitch | H04B 15/04 455/78 |
| 2014/0219193 | A1 | 8/2014 | Linde et al. | |
| 2016/0262056 | A1* | 9/2016 | Chen | H04W 28/20 |
| 2016/0345276 | A1* | 11/2016 | Sun | H04W 52/286 |
| 2017/0373730 | A1* | 12/2017 | Pehlke | H04B 7/0404 |

OTHER PUBLICATIONS

European Office Action for EP Application No. 17202597.5 dated Dec. 19, 2018.

* cited by examiner

|  | WiFi+BT(A2DP) | WiFi+BT(eSCO) | WiFi+BLE | | WiFi+BLE+BT(A2DP) | |
|---|---|---|---|---|---|---|
|  | WiFi Tput [Mbps] | WiFi Tput [Mbps] | WiFi Tput [Mbps] | BLE Scan [%] | WiFi Tput [Mbps] | BLE Scan [%] |
| CONVENTIONAL WI-FI MIMO ANTENNA USING TDM DIVISION (2 ANT) | 103 (-26%) | 48 (-66%) | 127 (-9%) | 9% | 81 (-42%) | 2% |
| WI-FI MIMO + BT ANTENNA (3 ANT) | 133 (-5%) | 141 (-0%) | 138 (-1%) | 47% | 113 (-19%) | 19% |
| WI-FI MIMO + BT ANTENNA (2 ANT) | 70 (-50%) | 70 (-50%) | 70 (-50%) | 47% | 70 (-50%) | 19% |

FIG.13

ELECTRONIC DEVICE AND METHOD OF CONTROLLING WIRELESS COMMUNICATION THEREOF

CROSS-REFERENCE TO RELATED APPLICATION

This application is based on and claims priority under 35 U.S.C. § 119 to Korean Application Serial No. 10-2017-0002339, which was filed in the Korean Intellectual Property Office on Jan. 6, 2017, the content of which is incorporated by reference herein in its entirety.

TECHNICAL FIELD

The present disclosure relates generally to an electronic device and a method of controlling wireless communication thereof.

BACKGROUND

Electronic devices (for example, mobile terminals, smart phones, and wearable electronic devices) may provide various functions. For example, smart phones may provide not only a basic voice call function but also short-range wireless communication (for example, Bluetooth, Wi-Fi, or Near Field Communication (NFC)), mobile communication (3G (generation), 4G, or 5G), a music or video reproduction function, a photography function, a navigation function, and a messenger function.

Such electronic devices may include a plurality of antennas because various kinds of wireless communication, such as mobile communication, short-range wireless communication, long-distance wireless communication, and location information reception, are supported. However, the electronic devices may have limited space for installation of a plurality of antennas due to miniaturization and slimming thereof. Accordingly, at least some of a plurality of communication modules of the electronic device may share a single antenna (hereinafter, referred to as a "common antenna"). For example, a Bluetooth communication module and a Wi-Fi communication module of the electronic device may use the common antenna through a time-division scheme.

When a plurality of communication modules (for example, a Bluetooth communication module and a Wi-Fi communication module) share one antenna in a time-division scheme, data throughput of the electronic device may be reduced, a connection thereof may be temporarily disconnected, or the electronic device may not receive data. For example, when a use frequency and an amount of use of the Wi-Fi communication module increase, the Bluetooth communication module cannot secure sufficient antenna resources (for example, the time during which the one antenna is allocated to the Bluetooth communication module is shortened), so that the communication is temporarily disconnected or data cannot be received. Further, when a use frequency and an amount of the use of the Bluetooth communication module increase, data throughput of the Wi-Fi communication module may be reduced.

Meanwhile, recently, peripheral devices using Bluetooth (for example, Bluetooth headsets, Bluetooth hands-free, Bluetooth keyboards, Bluetooth speakers, smart watches, Bluetooth Low Energy (BLE) devices, Internet of Things (IoT) devices, vehicles supporting Bluetooth communication connection with smart phones (for example, smart cars) have proliferated. Further, such electronic devices may be simultaneously connected to a plurality of Bluetooth devices. As described above, as the number of electronic devices including a plurality of communication modules using the common antenna increases, interest in the above-described problems also increases.

SUMMARY

Various example embodiments of the present disclosure to address the above problems may provide an electronic device and a method of controlling wireless communication thereof, which can control the use of an antenna by a plurality of communication modules based on occupancy information (for example, use frequency and/or amount of use) of antennas of the plurality of communication modules.

Further, various example embodiments of the present disclosure may provide an electronic device and a method of controlling wireless communication thereof, which can prevent and/or reduce signal loss by controlling a plurality of communication modules to use different antennas when antenna occupancy information (for example, use frequency and/or amount of use thereof) of the plurality of communication modules satisfies a reference condition (a predetermined condition).

In accordance with an example aspect of the present disclosure, an electronic device is provided. The electronic device includes: a first antenna configured to support first short-range wireless communication and second short-range wireless communication; a second antenna; and a processor, wherein the processor is configured to determine information related to occupancy of the first antenna by the second short-range wireless communication, to designate the first antenna as an antenna for performing the first short-range wireless communication from an antenna for supporting the first short-range wireless communication and the second short-range wireless communication when the information related to the occupancy satisfies a predetermined condition, to perform the first short-range wireless communication through the first antenna, and to perform the second short-range wireless communication through the second antenna.

In accordance with another example aspect of the present disclosure, an electronic device is provided. The electronic device includes: a first antenna configured to support first short-range wireless communication and second short-range wireless communication; a second antenna; and a processor, wherein the processor is configured to determine information related to occupancy of the first antenna by the first short-range wireless communication and/or the second short-range wireless communication, to at least one of: simultaneously and sequentially perform the first short-range wireless communication and the second short-range wireless communication through the first antenna when the information related to the occupancy satisfies a predetermined condition; and to perform one kind of short-range wireless communication selected between the first short-range wireless communication and the second short-range wireless communication through the second antenna and to perform another kind of short-range wireless communication through the first antenna when the information related to the occupancy satisfies another predetermined condition.

In accordance with another example aspect of the present disclosure, a method of controlling wireless communication by an electronic device including a first antenna and a second antenna configured to support first short-range wireless communication and second short-range wireless communication is provided. The method includes: determining information related to occupancy of the first antenna by the second short-range wireless communication, designating the first antenna as an antenna for performing the first short-range wireless communication from an antenna for supporting the first short-range wireless communication and the second short-range wireless communication when the information related to the occupancy satisfies a predetermined condition, performing the first short-range wireless communication through the first antenna, and performing the second short-range wireless communication through the second antenna.

In accordance with another example aspect of the present disclosure, a method of controlling wireless communication by an electronic device including a first antenna and a second antenna for supporting first short-range wireless communication and second short-range wireless communication is provided. The method includes: determining information related to occupancy of the first antenna by the first short-range wireless communication or the second short-range wireless communication; simultaneously or sequentially performing the first short-range wireless communication and the second short-range wireless communication through the first antenna when the information related to the occupancy satisfies a predetermined condition; and performing one kind of short-range wireless communication selected from between the first short-range wireless communication and the second short-range wireless communication through the second antenna and performing the other kind of short-range wireless communication through the first antenna when the information related to the occupancy satisfies another predetermined condition.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIG. 13 is a table illustrating a result of an experiment on the performance of wireless communication of an electronic device according to an example embodiment of the present disclosure.

DETAILED DESCRIPTION

Figure 1:
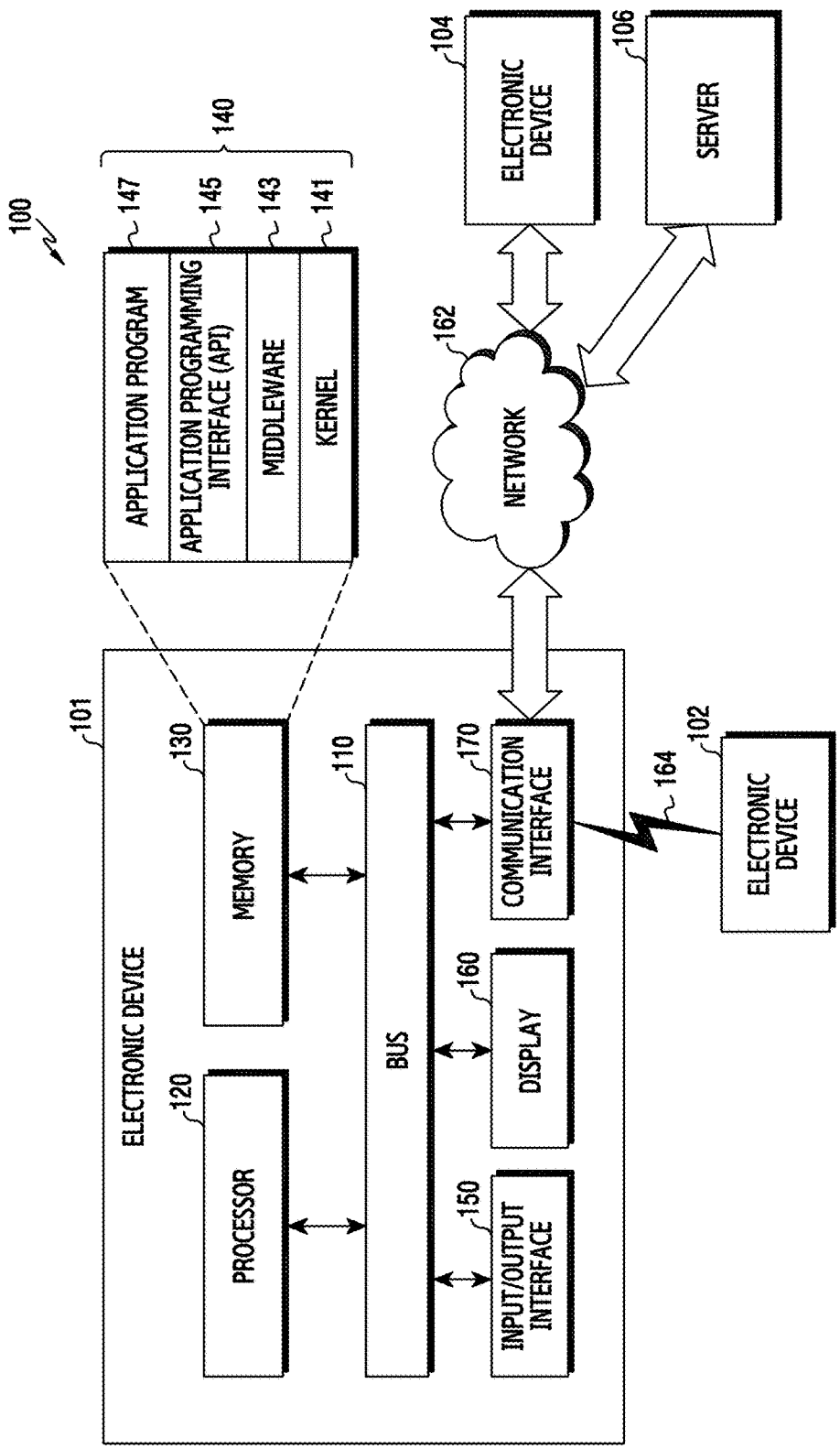
FIG. 1 is a diagram illustrating a network environment including an electronic device according to various example embodiments of the present disclosure.

Various example embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance, and do not limit corresponding elements. The expressions may be used for distinguishing one element from another element. When it is described that an element (such as a first element) is operatively or communicatively "coupled to" or "connected to" another element (such as a second element), the element can be directly connected to the other element or can be connected through another element (such as a third element).

The expression "configured to (or set)", as used in the present disclosure, may be used interchangeably with, for example, "suitable for," "having the capacity to," "designed to," "adapted to," "made to," or "capable of" according to the situation. The term "configured to (or set)" does not only refer to "specifically designed to" by hardware. Alternatively, in some situations, the expression "apparatus configured to" may refer to a situation in which the apparatus "can" operate together with another apparatus or component. For example, the phrase "a processor configured (or set) to perform A, B, and C" may be, for example, and without limitation, a dedicated processor, a generic-purpose processor (such as a central processing (CPU) or an application processor (AP)) that can perform a corresponding operation by executing at least one software program stored at an exclusive processor (such as an embedded processor) for performing a corresponding operation or at a memory device.

An electronic device, according to embodiments of the present disclosure, may be embodied as, for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, or the like, but is not limited thereto. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit, or the like, but is not limited thereto. The electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, or the like, but is not limited thereto.

In another embodiment, the electronic device may be embodied as at least one of various medical devices (such as, various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of things (IoT) device (e.g., a light bulb, various sensors, a sprinkler device, a fire alarm, a thermostat, a street light, a toaster, sports equipment, a hot water tank, a heater, and a boiler), or the like, but is not limited thereto.

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device), or the like, but is not limited thereto. An electronic device, according to an embodiment, can be a flexible electronic device or a combination of two or more of the foregoing various devices. An electronic device is not limited to the foregoing devices may be embodied as a newly developed electronic device. The term "user", as used herein, can refer to a person using an electronic device or a device using an electronic device (e.g., an artificial intelligence electronic device).

FIG. 1 is a block diagram illustrating a network environment system (100) according to various example embodiments of the present disclosure.

Referring initially to FIG. 1, electronic devices 101, 102, 104 and/or a server 106 may be connected to each other via a network 162 and/or a wireless (e.g., short-range) communication 164. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. The electronic device 101 may be provided without at least one of the components, or may include at least one additional component.

The bus 110 can include a circuit for connecting the components 120 through 170 and delivering communication signals (e.g., control messages or data) therebetween.

The processor 120 may include various processing circuitry, such as, for example, and without limitation one or more of a dedicated processor, a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170 may include various communication circuitry and, for example, can set a communication between the electronic device 101 and an external device (e.g., an electronic device 102, a second electronic device 104, or a server 106). For example, the communication interface 170 can communicate with the external device (e.g., the second external electronic device 104 or the server 106) over a network 162 through wireless communication or wired communication. The communication interface 170 may additionally communicate with an electronic device (e.g., the electronic device 102) using a short-range wireless communication connection 164.

The wireless communication, for example, can include cellular communication using at least one of Long Term Evolution (LTE), LIE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, as shown by an element 164 of FIG. 1, at least one of Wireless Fidelity (WiFi), LiFi (light fidelity), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
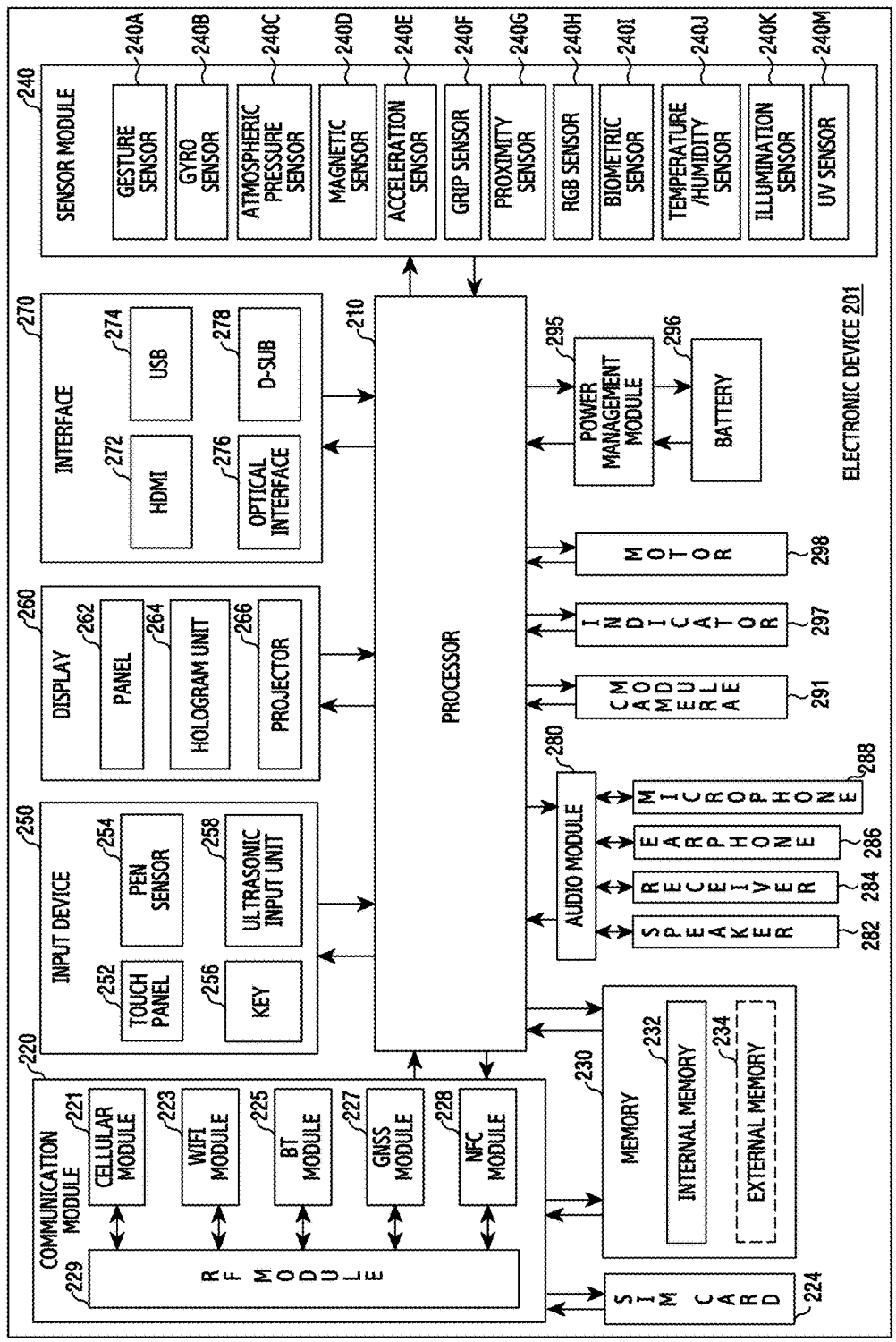
FIG. 2 is a block diagram illustrating an example electronic device according to various example embodiments.

FIG. 2 is a block diagram illustrating an example electronic device 201 according to an example embodiment of the present disclosure.

The electronic device 201, for example, can include all or part of the above-described electronic device 101 of FIG. 1. The electronic device 201 may include one or more processors (e.g., an AP) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210, for example, may include various processing circuitry and can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components illustrated in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 may include various communication circuitry, such as, for example, and without limitation, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module.

The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and/or an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a Red, Green, Blue (RGB) sensor), a biometric sensor 240I, a temperature/humidity sensor 240J, and/or an ultraviolet (UV) sensor 240M. Additionally, or alternately, though not shown, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 may include various input circuitry, such as, for example, and without limitation, at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201.

The interface 270 may include various interface circuitry, such as, for example, and without limitation, an HDMI 272, a USB 274, an optical interface 276, or a D-subminiature (D-sub) 278. The interface 270 can be included in, for example, the communication interface 170 of FIG. 1. Additionally or alternatively, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
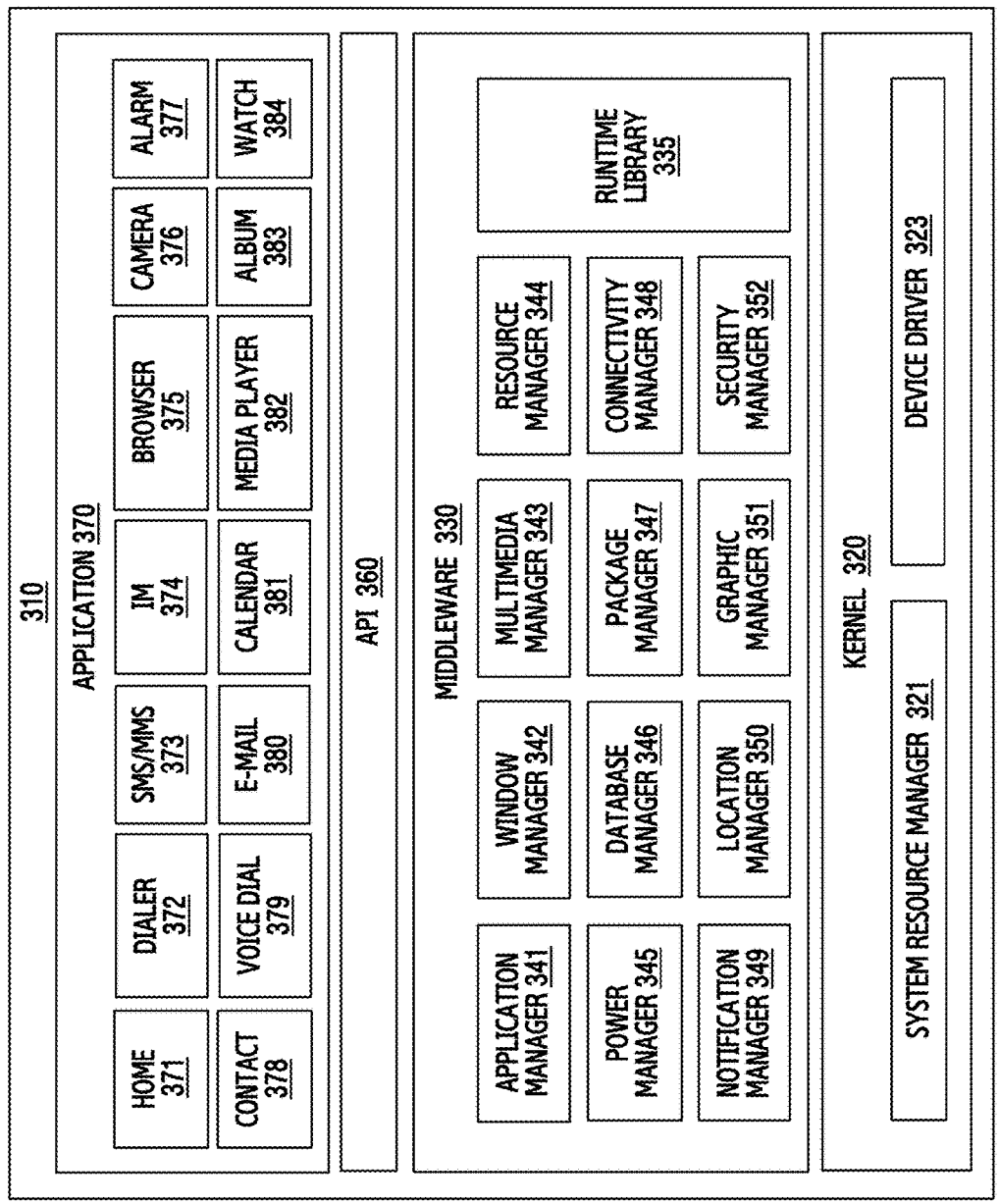
FIG. 3 is a block diagram illustrating an example program module according to various example embodiments.

FIG. 3 is a block diagram illustrating an example program module according to an example embodiment of the present disclosure.

A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Eizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver.

The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity, temperature, and/or power of the battery, and determine or provide power information for an operation of the electronic device using corresponding information among the capacity, temperature, and/or power of the battery. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a watch 384. Additionally, though not shown, the application 370 may include, for example, and without limitation, applications relating to health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

An electronic device according to an embodiment of the present disclosure may include a plurality of wireless communication modules, and the plurality of wireless communication modules may perform a plurality of wireless communication using an antenna in common, respectively. If a predetermined condition is satisfied while performing the plurality of wireless communications using the antenna in common, the electronic device may perform a portion of the plurality of wireless communications using another antenna.

Hereinafter, various embodiments of the present disclosure will be described with reference to an example where the plurality of wireless communication module comprises a first short-range wireless communication module and a second short-range wireless communication module, the first short-range wireless communication module is, for purposes of the example, a bluetooth communication module, and the second short-range wireless communication module is, for the purposes of example, a wifi communication module.

Figure 4:
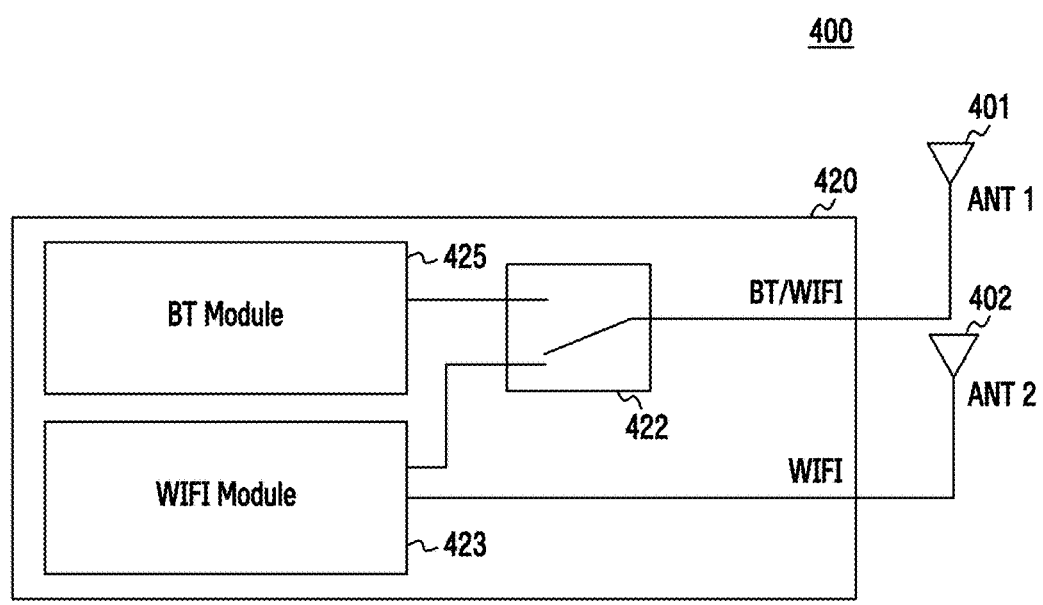
FIG. 4 is a block diagram illustrating an example configuration of an electronic device according to an example embodiment of the present disclosure.

FIG. 4 is a block diagram illustrating an example configuration of an electronic device according to an example embodiment of the present disclosure.

Referring to FIG. 4, an electronic device 400 according to an example embodiment of the present disclosure may include, for example, all or some of the elements of the electronic device 101 illustrated in FIG. 1 or the electronic device 201 illustrated in FIG. 2.

The electronic device 400 according to an embodiment of the present disclosure may include a first antenna 401, a second antenna 402, and a communication module (e.g., including communication circuitry) 420. The communication module 420 may, for example, and without limitation, include various circuitry, such as, a Wi-Fi module (e.g., including Wi-Fi circuitry) 423, a Bluetooth module (e.g., including Bluetooth circuitry) 425, and a switching module (e.g., including switching circuitry) 422.

The first antenna 401 may, for example, support Bluetooth communication and Wi-Fi communication. For example, the first antenna 401 may transmit/receive a wireless signal in a first band (for example, 2.4 GHz) or a wireless signal in both the first band and a second band (for example, 5 GHz). The first antenna 401 may be selectively connected to the Bluetooth module 425 or the Wi-Fi module 423 through the switching module 422.

The second antenna 402 may support Wi-Fi communication. For example, the second antenna 402 may transmit/receive a wireless signal in the first band (for example, 2.4 GHz) or the second band (for example, 5 GHz) or a wireless signal in both the first band and the second band. The second antenna 402 may be an antenna for supporting Multiple-Input Multiple-Output (MIMO) technology for Wi-Fi communication. The second antenna 402 may be connected to the Wi-Fi module 423.

When Bluetooth communication and Wi-Fi communication are activated, the communication module 420 may use the first antenna 401 in common to transmit/receive a Bluetooth signal and/or a Wi-Fi signal. For example, when the Wi-Fi signal is transmitted/received in the first band, the communication module 420 may transmit/receive the Bluetooth signal by controlling the switching module 422 such that the Bluetooth module 425 is connected to the first antenna 401 and transmit/receive the Wi-Fi signal by controlling the switching module 422 such that the Wi-Fi module 423 is connected to the first antenna 401. As described above, the communication module 420 may sequentially perform Bluetooth communication and Wi-Fi communication through the first antenna 401.

Meanwhile, when the Wi-Fi signal is transmitted/received in the second band, the communication module 420 may simultaneously perform Bluetooth communication and Wi-Fi communication through the first antenna 401. To this end, although not illustrated in FIG. 4, the communication module 420 may include a signal separation device (including various circuitry, such as, for example, a duplexer, a diplexer, or a filter) for separating the first-band signal and the second-band signal between the first antenna 401 and the switching module 422. For example, the first-band signal and the second-band signal, simultaneously received through the first antenna 401, may be separated by the signal separation device (not shown), and the separated first-band signal may be transmitted to the Bluetooth module 425 through the switching module 422 and the separated second-band signal may be transmitted to the Wi-Fi module 423.

The communication module 420 according to various embodiments of the present disclosure may identify (determine) whether information related to the occupancy of the first antenna 401 by the Wi-Fi module 423 satisfies a predetermined condition. For example, the communication module 420 may determine whether the number of times of occupancy, the occupancy time, the time of use, an occupancy rate, or a time occupancy rate (time share), or the like, of the first antenna 401 by the Wi-Fi module 423 increases to a particular value (for example, 5 times, 5 seconds, 70%, or 50% per second) or more.

When the determined information related to the occupancy satisfies the predetermined condition, the communication module 420 may designate (allocate or change) the first antenna 401 as a dedicated antenna for supporting Bluetooth communication from a common antenna for supporting both Bluetooth communication and Wi-Fi communication. For example, the communication module 420 may control the switching module 422 to connect the Bluetooth module 425 and the first antenna 401. Thereafter, the Bluetooth module 425 may perform Bluetooth communication through the first antenna 401, and the Wi-Fi module 423 may perform Wi-Fi communication through the second antenna 402.

As described above, the communication module 420 according to an embodiment of the present disclosure may designate (allocate or change) the first antenna 401 as the dedicated antenna for Bluetooth communication in order to prevent and/or reduce a problem in which the Bluetooth module 425 cannot receive the Bluetooth signal, for example, a problem in which a signal is lost as the number of times of occupancy, the occupancy time, the time of use, the occupancy rate, or the time occupancy rate of the first antenna 401 by the Bluetooth module 425 decreases due to the increase in the number of times of occupancy, the occupancy time, the time of use, the occupancy rate, or the time occupancy rate of the first antenna 401 by the Wi-Fi module 423.

According to some embodiments, when the determined information related to the antenna occupancy satisfies the predetermined condition, the communication module 420 may control the Wi-Fi module 423 to perform Wi-Fi communication in the second band. For example, the communication module 420 may transmit/receive the Bluetooth signal in the first band through the first antenna 401 and the Wi-Fi signal in the second band through the first antenna 401 and the second antenna 402. According to another embodiment, the communication module 420 may output (display) a popup window that asks about whether to change the frequency band for Wi-Fi communication (for example, from the first band to the second band), and, when the change in the frequency band is accepted by the user, control the Wi-Fi module 423 to perform the Wi-Fi communication in the second band. According to yet another embodiment, the communication module 420 may determine whether the strength of the Wi-Fi signal in the second band is higher than or equal to a preset value, and, when the strength is higher than or equal to the preset value, change the frequency band.

According to some embodiments, the communication module 420 may control the right to use the first antenna 401 based on the information related to the occupancy of the first antenna 401 by the Bluetooth module 425. For example, when the information related to the occupancy of the first antenna 401 by the Bluetooth module 425 satisfies the predetermined condition, the communication module 420 may designate (allocate or change) the first antenna 401 as the dedicated antenna for Bluetooth communication.

According to another embodiment, the communication module 420 may control the right to use the first antenna 401 based on data throughput (or amount of use) of the Wi-Fi module 423 or the Bluetooth module 425. For example, when the increase in the number of times of occupancy, the occupancy time, and the time of use, the occupancy rate, or the time occupancy rate of the first antenna 401 by the Bluetooth module 425 is needed (required) as the number of times of occupancy, the occupancy time, and the time of use, the occupancy rate, or the time occupancy rate of the first antenna 401 by the Wi-Fi module 423 increases due to the increase in the amount of data used by the Wi-Fi module 423 or the increase in the amount of data used by the Bluetooth module 425, the communication module 420 may designate the first antenna 401 as the dedicated antenna for Bluetooth communication.

Meanwhile, FIG. 4 illustrates that the Bluetooth module 425, the Wi-Fi module 423, and the switching module 422 are included in the communication module 420. However, various embodiments of the present disclosure are not limited thereto. For example, the Bluetooth module 425, the Wi-Fi module 423, and the switching module 422 may be included outside the communication module 420 in the electronic device 400 as separate elements. At least some of the Bluetooth module 425, the Wi-Fi module 423, and the switching module 422 may be implemented as one module and included in the communication module 420 or included in the electronic device 400 as separate elements.

Further, although FIG. 4 illustrates that the communication module 420 controls the right to use the first antenna 401, an application processor (not shown) or a communication processor (not shown) may determine the number of times of occupancy, the occupancy time, the time of use, the occupancy rate, or the time occupancy rate of the Wi-Fi module 423 or the Bluetooth module 425 and control the right to use the first antenna 401 in another embodiment.

Although FIG. 4 illustrates that the first antenna 401 is the common antenna for supporting Wi-Fi communication and Bluetooth communication and the second antenna 402 is the antenna for supporting Wi-Fi communication, the first antenna 401 may be the antenna for supporting Wi-Fi communication and the second antenna 402 may be the common antenna for supporting Wi-Fi communication and Bluetooth communication in some embodiments. Both the first antenna 401 and the second antenna 402 may be common antennas. According to an embodiment of the present disclosure, the first antenna or the second antenna may be an antenna for supporting cellular communication.

Further, although FIG. 4 illustrates only one switching module 422 connected to the first antenna 401, the communication module 420 may further include another switching module (hereinafter, referred to as a second switching module) (not shown) for selectively connecting the W-Fi module 423 and the Bluetooth module 425 with the second antenna 402. According to another embodiment, the communication module 420 may include only the second switching module.

Meanwhile, although not illustrated in FIG. 4, the electronic device 400 may not include some of the described elements. According to another embodiment, the electronic device 400 may further include at least one other element (for example, a digital broadcasting module, a fingerprint recognition sensor, an input device, a memory, and a battery) at the same level as the above-described elements.

Figure 5:
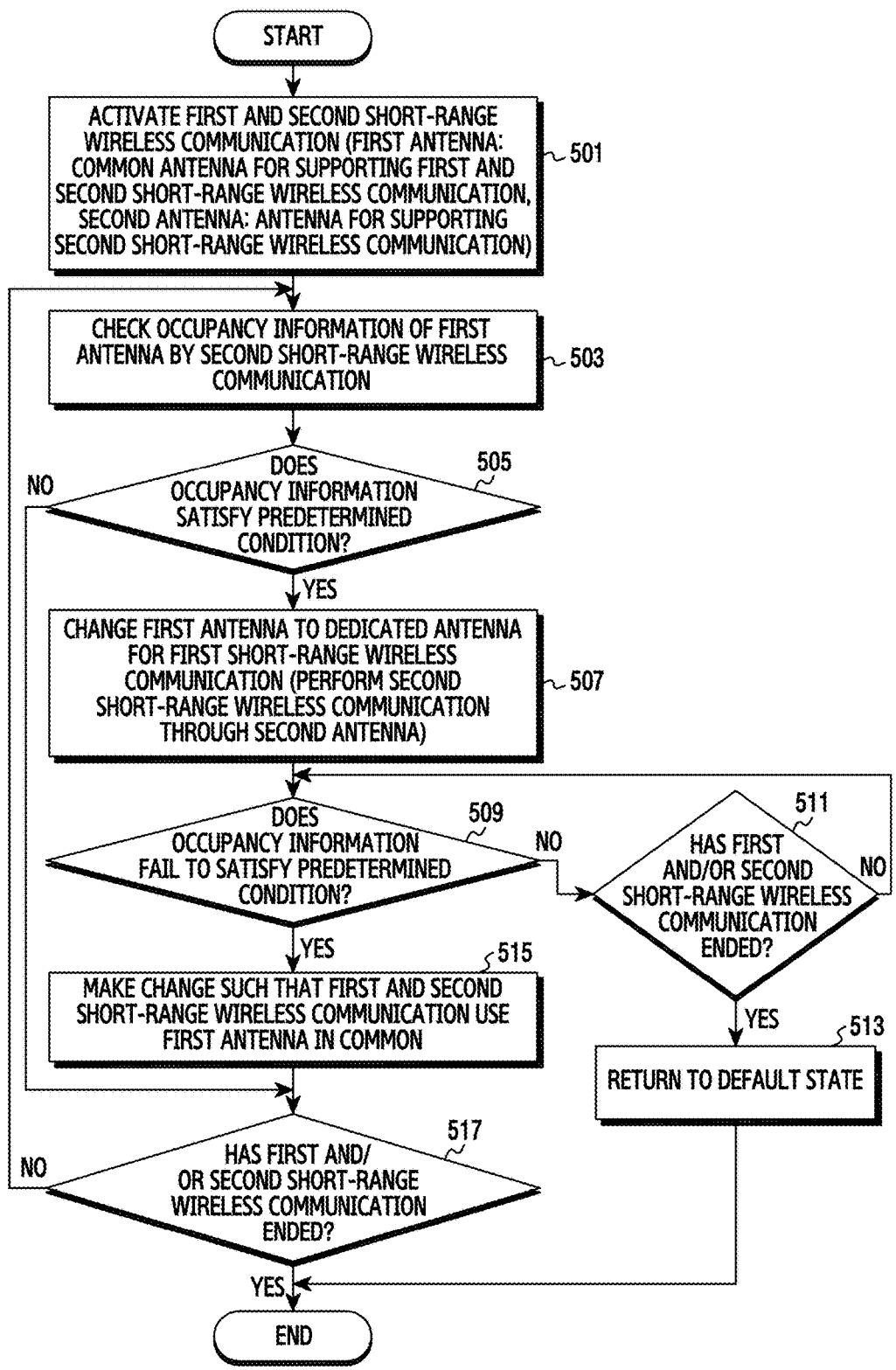
FIG. 5 is a flowchart illustrating an example procedure of controlling wireless communication of an electronic device according to an example embodiment of the present disclosure.

FIG. 5 is a flowchart illustrating an example procedure of controlling wireless communication of the electronic device according to an example embodiment of the present disclosure.

Referring to FIG. 5, the communication module (for example, the communication module 170 of FIG. 1, the communication module 220 of FIG. 2, or the communication module 420 of FIG. 4) of the electronic device (for example, the electronic device 101, the electronic device 201, or the electronic device 400) according to an embodiment of the present disclosure may activate first and second short-range wireless communication in operation 501. The first short-range communication may be Bluetooth communication and the second short-range wireless communication may be Wi-Fi communication. When the first and second short-range wireless communication are activated, the communication module may activate a first short-range wireless communication module (for example, the Bluetooth module 225 of FIG. 2 or the Bluetooth module 425 of FIG. 4) and a second short-range wireless communication module (for example, the Wi-Fi module 223 of FIG. 2 or the Wi-Fi module 423 of FIG. 4).

The first short-range wireless communication module may perform first short-range wireless communication through the first antenna (for example, the first antenna 401).

The second short-range wireless communication module may perform second short-range wireless communication through the first antenna and the second antenna (for example, the second antenna 402). For example, the second short-range wireless communication module may support MIMO. As described above, the first short-range wireless communication module and the second short-range wireless communication module may use the first antenna in common.

In operation 503, the communication module according to an embodiment of the present disclosure may check occupancy information of the first antenna by the second short-range wireless communication (the number of times of occupancy, the occupancy time, the time of use, the occupancy rate, or the time occupancy rate, or the like, but is not limited thereto).

In operation 505, the communication module according to an embodiment of the present disclosure may determine whether the occupancy information satisfies a predetermined condition. For example, and without limitation, the communication module may determine whether the number of times of occupancy, the occupancy time, the time of use, the occupancy rate, or the time occupancy rate of the first antenna by the second short-range wireless communication is higher than or equal to a particular value. The particular value may be a value at which a signal is lost because the number of times of occupancy, the occupancy time, the time of use, the occupancy rate, or the time occupancy rate of the first antenna by the first short-range wireless communication is reduced due to an increase in the number of times of occupancy, the occupancy time, the time of use, the occupancy rate, or the time occupancy rate of the first antenna by the second short-range wireless communication. The particular value may be set by a manufacturer of the electronic device through various experiments and may be changed by the user. The particular value may vary depending on the number of connected Bluetooth devices or Bluetooth data throughput. For example, as the number of connected Bluetooth devices and/or the data throughput increase, the particular value may be set to be a smaller value. In other words, the particular value set based on the occupancy information of the Wi-Fi communication may be inversely proportional to the occupancy information of the Bluetooth communication.

According to some embodiments, the predetermined condition may be set in consideration of antenna efficiency.

When the predetermined condition is not satisfied based on the result of the determination in operation 505, the communication module may perform operation 517 described below. On the other hand, when the predetermined condition is satisfied, the communication module may designate the first antenna as the dedicated antenna for the first short-range wireless in operation 507. At this time, the second short-range wireless communication may be performed through only the second antenna. For example, the second short-range wireless communication module may operate in a Single-Input Single-Output (SISO) mode.

According to some embodiments, the communication module may determine which short-range wireless communication module is to be connected to the first antenna and the second antenna in consideration of efficiency of the first antenna and/or the second antenna. For example, when both the first antenna and/or the second antenna can be selectively connected to the Wi-Fi module and the Bluetooth module, the communication module may connect the Wi-Fi module with the antenna having relatively higher efficiency for Wi-Fi communication, selected from between the first antenna and the second antenna.

Further, in the case where both the first antenna and/or the second antenna can be selectively connected to the Wi-Fi module and the Bluetooth module, the communication module may select a combination having the best efficiency. For example, the communication module may select a combination having higher efficiency between a first combination in which the first antenna is connected to the Bluetooth module and the second antenna is connected to the Wi-Fi module and a second combination in which the first antenna is connected to the Wi-Fi module and the second antenna is connected to the Bluetooth module.

According to some embodiments, the communication module may control the Wi-Fi module to perform Wi-Fi communication in the second band. For example, the communication module may transmit/receive a Bluetooth signal in the first band through the first antenna and transmit/receive a Wi-Fi signal in the second band through the first antenna and the second antenna. According to another embodiment, the communication module may output (display) a popup window that asks about whether to change the frequency band (for example, from the first band to the second band) for the Wi-Fi communication, and, when the change in the frequency band is accepted by the user, control the Wi-Fi module to perform Wi-Fi communication in the second band. According to yet another embodiment, the communication module may determine whether the strength of the Wi-Fi signal in the second band is higher than or equal to a preset value, and, when the strength is higher than or equal to the preset value, change the frequency band.

In operation 509, the communication module according to an embodiment of the present disclosure may determine whether the occupancy information fails to satisfy the predetermined condition. For example, the communication module may determine whether the number of times of occupancy, the occupancy time, the time of use, the occupancy rate, or the time occupancy rate of the first antenna by the second short-range wireless communication is reduced to be smaller than the particular value. According to some embodiments, the predetermined condition may be set in consideration of antenna efficiency.

When the occupancy information does not fail to satisfy the predetermined condition based on the result of the determination in operation 509, the communication module may determine whether the first and/or second short-range wireless communication has ended (off) in operation 511. When the first and/or second short-range wireless communication is determined not to have ended (off) based on the result of the determination in operation 511, the communication module may return to operation 509 and repeat the above operations. On the other hand, when the first and/or second short-range wireless communication is determined to have ended (off) based on the result of the determination in operation 511, the communication module may return to a default state and end the wireless communication control procedure in operation 513. For example, the communication module may control the short-range wireless communication, which has not ended, to use the first antenna. For example, when the first short-range wireless communication ends, the communication module may control the second short-range wireless communication to use the first antenna and the second antenna. When the second short-range wireless communication ends, the communication module may control the first short-range wireless communication to use the first antenna. When both the first and second short-range wireless communication end, the communication module may deactivate both the first and second short-range wireless communication modules.

When the occupancy information fails to satisfy the predetermined condition based on the result of the determination in operation 509, the communication module may make a change such that the first short-range wireless communication and the second short-range wireless communication use the first antenna in common in operation 515.

In operation 517, the communication module according to an embodiment of the present disclosure may determine whether the first and/or second short-range wireless communication has ended (off). When the first and/or second short-range wireless communication is determined not to have ended (off) based on the result of the determination in operation 517, the communication module may return to operation 503 and repeat the above operations. On the other hand, when the first and/or second short-range wireless communication is determined to have ended (off) based on the result of the determination in operation 517, the communication module may end the wireless communication control procedure.

According to various example embodiments, the communication module may control the right to use the first antenna based on information related to occupancy of the first antenna by the first short-range wireless communication. For example, when the number of times of occupancy, the occupancy time, the time of use, the occupancy rate, or the time occupancy rate of the first antenna by the first short-range wireless communication is reduced to a particular value or smaller, the communication module may designate (allocate or change) the first antenna as the dedicated antenna for Bluetooth communication.

According to various example embodiments, the communicate module may control the right to use the first antenna based on data throughput (or amount of use) of the first short-range wireless communication module or the second short-range wireless communication module.

Although it has been described that the communication module controls the right to use the first antenna, an application processor (not shown) or a communication processor (not shown) included in the electronic device may determine the number of times of occupancy, the occupancy time, the time of use, the occupancy rate, or the time occupancy rate of the first antenna by the second short-range wireless communication and control the right to use the first antenna based on the result of the determination in another embodiment.

Further, it has been described that the first antenna is the common antenna for supporting the first and second short-range wireless communication and that the second antenna is the antenna for supporting the second short-range wireless communication, but the first antenna may be the antenna for supporting the second short-range wireless communication and the second antenna may be the common antenna for supporting the first and second short-range wireless communication in some embodiments. Both the first antenna and the second antenna may be common antennas for supporting the first and second short-range wireless communication.

Figure 6:
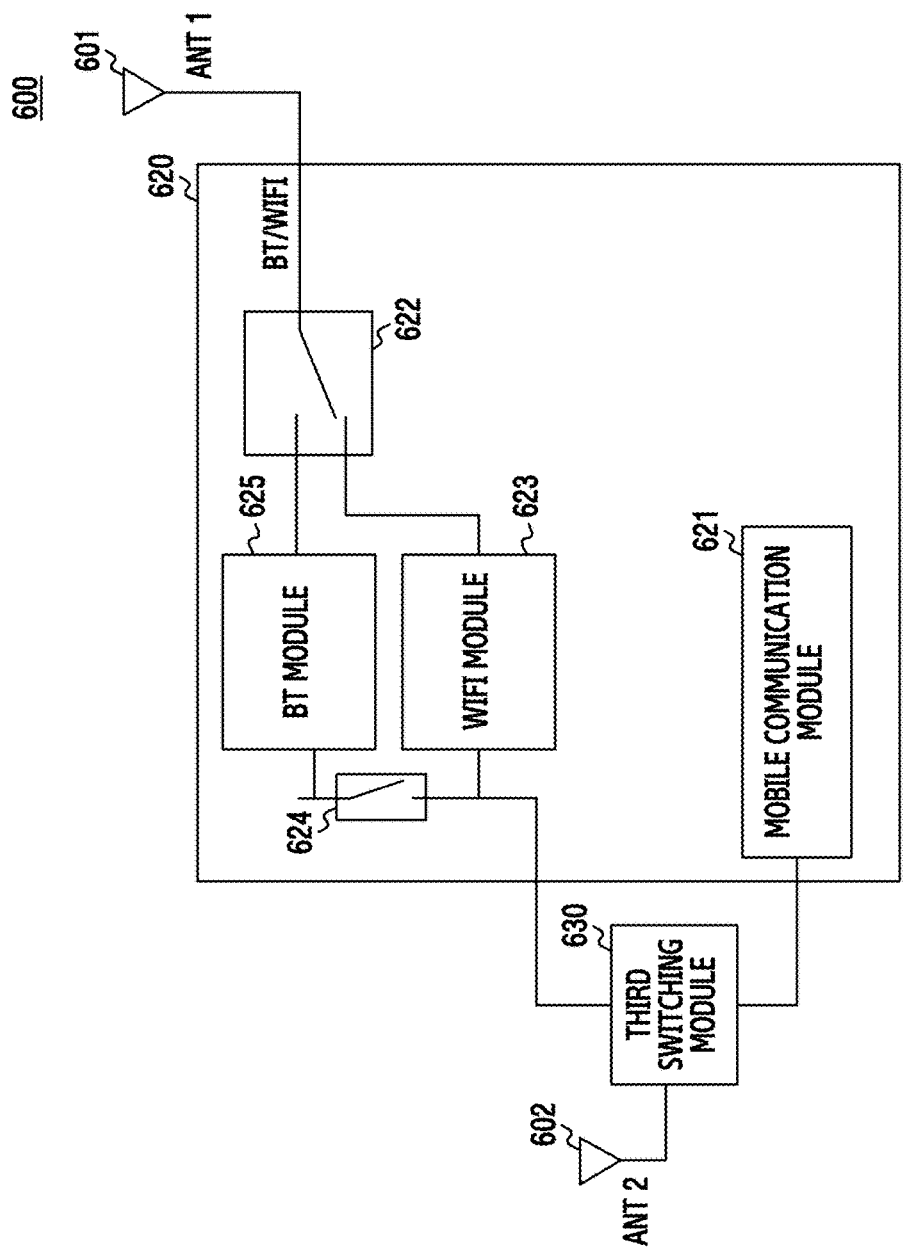
FIG. 6 is a block diagram illustrating an example configuration of an electronic device according to an example embodiment of the present disclosure.

FIG. 6 is a block diagram illustrating an example configuration of an electronic device according to an embodiment of the present disclosure.

Referring to FIG. 6, an electronic device 600 according to an embodiment of the present disclosure may include, for example, some or all of the elements of the electronic device 101 illustrated in FIG. 1 or the electronic device 201 illustrated in FIG. 2.

The electronic device 600 according to an embodiment of the present disclosure may include a first antenna 601, a second antenna 602, a communication module (e.g., including communication circuitry) 620, and a third switching module (e.g., including switching circuitry) 630. The communication module 620 may include a mobile communication module (e.g., including mobile communication circuitry) 621, a first switching module (e.g., including switching circuitry) 622, a Wi-Fi module (e.g., including Wi-Fi circuitry) 623, a second switching module (e.g., including switching circuitry) 624, and a Bluetooth module (e.g., including Bluetooth circuitry) 625.

The first antenna 601 may support Bluetooth communication and Wi-Fi communication. For example, the first antenna 601 may transmit/receive wireless signals in a first band (for example, 2.4 GHz) or both the first band and a second band (for example, 5 GHz). The first antenna 601 may be selectively connected to the Wi-Fi module 623 or the Bluetooth module 625 through the first switching module 622.

The second antenna 602 may be a main antenna for supporting mobile communication. For example, the second antenna 602 may transmit/receive a mobile communication signal of 3G, 4G, or 5G, such as CDMA, WCDMA, GSM, or GPRS. According to some embodiments, the second antenna 602 may be a diversity antenna operating with the main antenna or a GPS antenna for receiving location information. The second antenna 602 may transmit/receive a wireless signal in the first band. The second antenna 602 may be selectively connected to the second switching module 624 or the mobile communication module 621 through the third switching module 630, or may be simultaneously connected thereto. For example, the third switching module 630 may be a switch, a duplexer, a diplexer, or an extractor. According to an embodiment of the present disclosure, the second switching module 624 and the third switching module 630 are not always separated from each other, and the second antenna 602 may be selectively connected to the three modules 621, 623, and 625 through one switching module.

When Bluetooth communication and Wi-Fi communication are activated, the communication module 620 may use the first antenna 601 in common to transmit/receive a Bluetooth signal and/or a Wi-Fi signal. For example, when the Wi-Fi signal and the Bluetooth signal are transmitted/received in the first band, the communication module 620 may control the first switching module 622 to sequentially connect the Bluetooth module 625 and the Wi-Fi module 623 with the first antenna 601.

Meanwhile, when the Bluetooth signal is transmitted/received in the first band and the Wi-Fi signal is transmitted/received in the second band, the communication module 620 may simultaneously perform Bluetooth communication and Wi-Fi communication through the first antenna 601. To this end, although not illustrated in FIG. 6, the communication module 620 may include a signal separation device (for example, a duplexer, a diplexer, or a filter) for separating the first-band signal and the second-band signal between the first antenna 601 and the first switching module 622. For example, the first-band signal and the second-band signal simultaneously received through the first antenna 601 may be separated by the signal separation device (not shown), and the separated first-band signal may be transmitted to the Bluetooth module 625 through the switching module 622 and the separated second-band signal may be transmitted to the Wi-Fi module 623.

The communication module 620 according to various embodiments of the present disclosure may identify (determine) whether information related to the occupancy of the first antenna 601 by the Wi-Fi module 623 satisfies a predetermined condition. For example, the communication module 620 may determine whether the number of times of occupancy, the occupancy time, the time of use, the occupancy rate, or the time occupancy rate of the first antenna 601 by the Wi-Fi module 623 increases to a particular value or larger. For example, the communication module 620 may determine whether information on the occupancy of the first antenna 601 by the Wi-Fi module 623 interrupts (for example, signal disconnection or loss) communication of the Bluetooth module 625 when transmission or reception of a large amount of data through Wi-Fi is requested, a hot spot function is activated, or a screen-mirroring function is activated.

When the determined information on the occupancy satisfies the predetermined condition, the communication module 620 may designate (allocate or change) the first antenna 601 from the common antenna for supporting Bluetooth communication and Wi-Fi communication to the dedicated antenna for supporting the Wi-Fi communication. For example, the communication module 620 may control the first switching module 622 to connect the Wi-Fi module 623 with the first antenna 601 and control the second switching module 624 and the third switching module 630 to connect the Bluetooth module 625 with the second antenna 602. Thereafter, the Wi-Fi module 623 may perform Wi-Fi communication through the first antenna 601 and the Bluetooth module 625 may perform Bluetooth communication through the second antenna 602.

Meanwhile, when the third switching module 630 is a switch and the mobile communication module 621 makes a request to use the second antenna 602 in the state in which the Bluetooth module 625 uses the second antenna 602, the communication module 620 may control the Wi-Fi module 623 and the Bluetooth module 625 to use the first antenna 601 in common. On the other hand, when the third switching module 630 is a duplexer, a diplexer, or an extractor, the mobile communication module 621 and the Bluetooth module 625 may simultaneously use the second antenna 602.

When the occupancy information of the first antenna 601 by the Wi-Fi module 623 fails to satisfy the predetermined condition or when the first or second short-range wireless communication ends, the communication module 620 may restore the first antenna 601 to the antenna for supporting the Bluetooth communication and the Wi-Fi communication from the antenna for supporting the Wi-Fi communication. For example, when the predetermined condition is not satisfied, the communication module 620 may control the Wi-Fi module 623 and the Bluetooth module 625 to use the first antenna 601 in common. When the Wi-Fi communication ends, the communication module 620 may control the Bluetooth module 625 to use the first antenna 601. When the Bluetooth communication ends, the communication module 620 may control the Wi-Fi module 623 to use the first antenna 601 and the second antenna 602.

According to some embodiments, when the determined information related to the occupancy satisfies the predetermined condition, the communication module 620 may change the frequency band of the Wi-Fi communication. For example, the communication module 620 may transmit/receive a Bluetooth signal in the first band through the first antenna 601 and transmit/receive a Wi-Fi signal in the second band through the first antenna 601 or both the first antenna 601 and the second antenna 602. According to another embodiment, the communication module 620 may output (display) a popup window that asks about whether to change the frequency band of the Wi-Fi communication, and, when the change in the frequency band is accepted by the user, perform the Wi-Fi communication in the second band. According to yet another embodiment, the communication module 620 may determine whether the strength of the Wi-Fi signal in the second band is higher than or equal to a preset value, and, when the strength is higher than or equal to the preset value, change the frequency band.

Meanwhile, although FIG. 6 illustrates that the mobile communication module 621, the switching module 622, the Wi-Fi module 623, and the Bluetooth module 625 are included in the communication module 620, the mobile communication module 621, the switching module 622, the Wi-Fi module 623, and the Bluetooth module 625 may be included outside the communication module 620 in the electronic device 600 as separate elements.

Figure 7A:
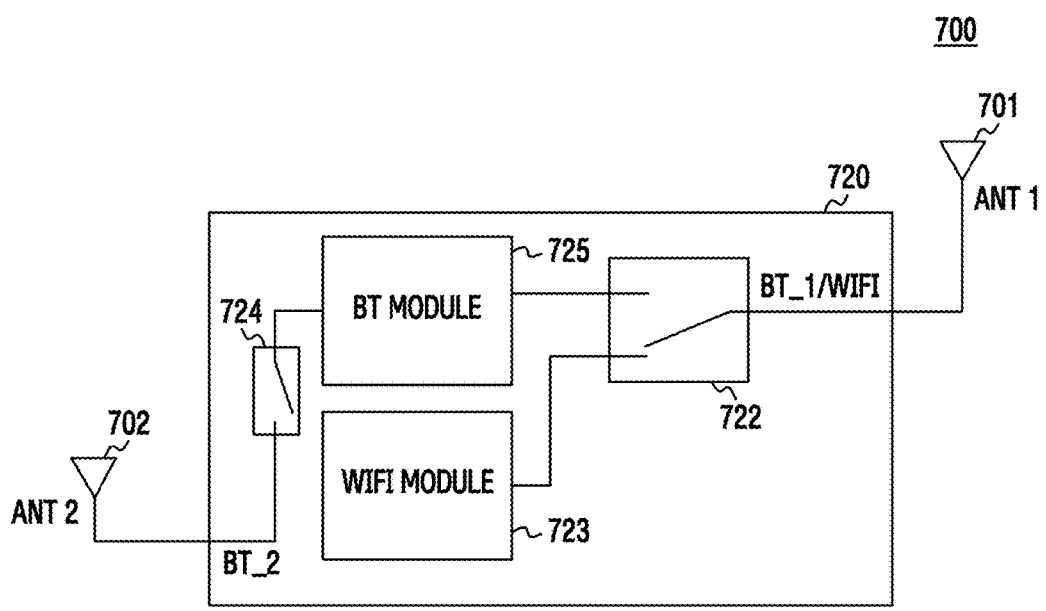
FIG. 7A is block diagram illustrating an example configuration of an electronic device according to an example embodiment of the present disclosure.
Figure 7B:
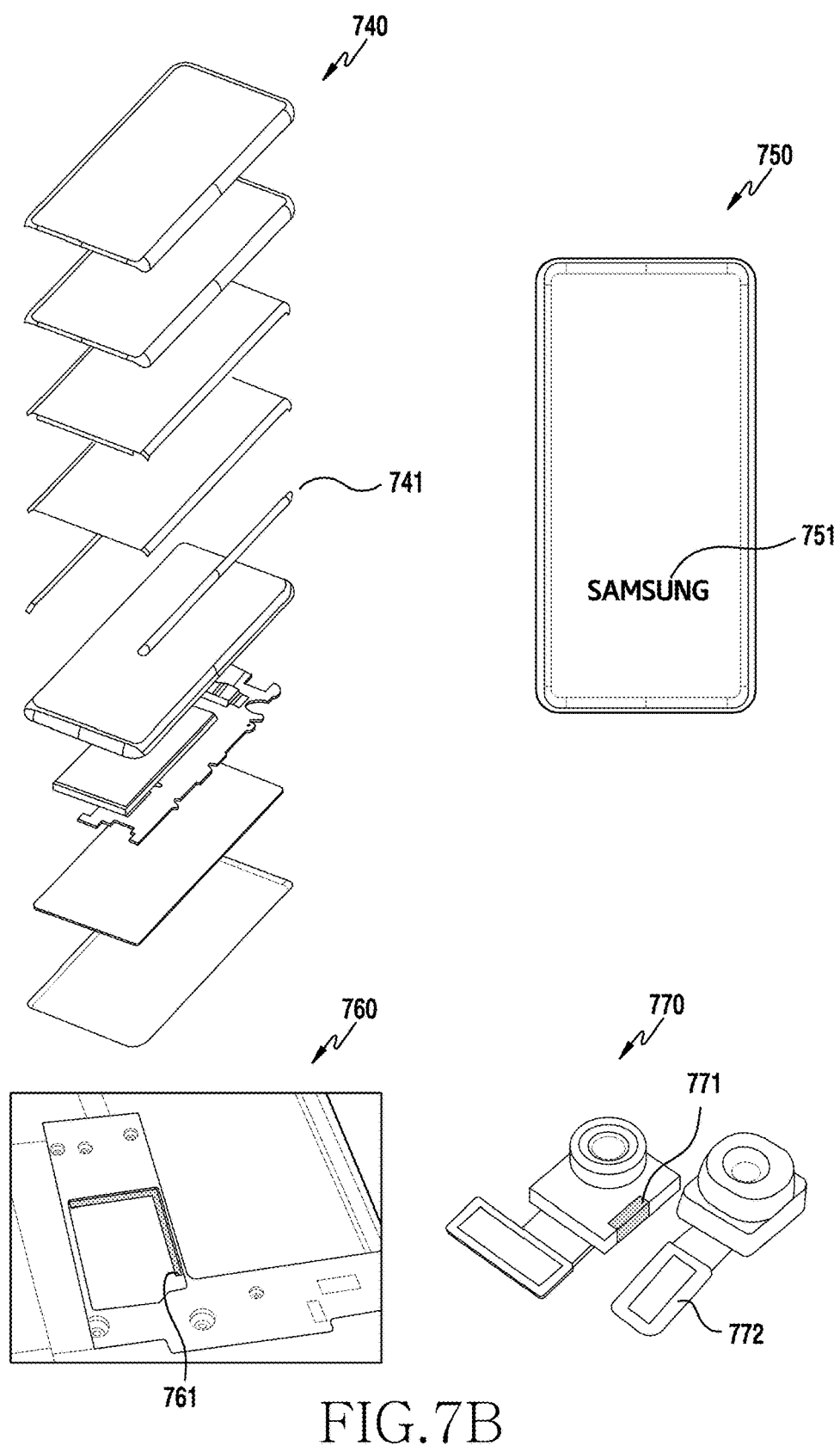
FIG. 7B is a diagram illustrating a mounting location of a second antenna of FIG. 7A according to an example embodiment of the present disclosure.

FIG. 7A is a block diagram illustrating an example configuration of an electronic device according to an example embodiment of the present disclosure, and FIG. 7B is a diagram illustrating the mounting location of a second antenna of FIG. 7A according to an example embodiment of the present disclosure.

Referring to FIGS. 7A and 7B, an electronic device 700 according to an embodiment of the present disclosure may include, for example, all or some of the elements of the electronic device 101 illustrated in FIG. 1 or the electronic device 201 illustrated in FIG. 2.

The electronic device 700 according to an embodiment of the present disclosure may include a first antenna 701, a second antenna 702, and a communication module (e.g., including communication circuitry) 720. The communication module 720 may, for example, and without limitation include various communication circuitry, including a first switching module (e.g., including switching circuitry) 722, a Wi-Fi module (e.g., including Wi-Fi circuitry) 723, a second switching module (e.g., including switching circuitry) 724, and a Bluetooth module (e.g., including Bluetooth circuitry) 725.

The first antenna 701 may support Bluetooth communication and Wi-Fi communication. For example, the first antenna 701 may transmit/receive wireless signals in a first band (for example, 2.4 GHz) or both the first band and a second band (for example, 5 GHz). The first antenna 701 may be selectively connected to the Wi-Fi module 723 or the Bluetooth module 725 through the first switching module 725.

The second antenna 702 may support Bluetooth communication. The second antenna 702 may be selectively connected to the Bluetooth module 725 through the second switching module 724. The second antenna 702 may be mounted to various locations of the electronic device 700 to which an antenna is not mounted in general due to a problem of deteriorating antenna performance. Accordingly, the second antenna 702 may have performance somewhat lower than that of the first antenna 701. For example, as indicated by reference numeral 740 of FIG. 7B, the electronic device 700 may include a pattern of the second antenna 702 in some elements 741 of the housing of the electronic device 700. In another example, as indicated by reference numeral 750 of FIG. 7B, the electronic device 700 may include a pattern of the second antenna 702 in logos 751 in the rear housing. In still another example, as indicated by reference numeral 760 of FIG. 7B, the electronic device 700 may include a pattern of a second antenna 761 in one side of the housing to which a speaker module is mounted. In yet another example, as indicated by reference numeral 770 of FIG. 7B, the electronic device 700 may include a second antenna pattern 771 or 772 in a camera housing or a connector.

As described above, when mounting space is lacking, the electronic device 700 according to an embodiment of the present disclosure may mount the second antenna 702 for supporting Bluetooth communication to various locations even if the performance is somewhat lowered. Accordingly, when the number of times of occupancy, the occupancy time, the time of use, the occupancy rate, or the time occupancy rate of the Wi-Fi communication is larger than or equal to a particular value, the electronic device 700 according to an embodiment of the present disclosure may perform Bluetooth communication through the second antenna 702, so as to stably maintain the number of times of occupancy, the occupancy time, the time of use, the occupancy rate, or the time occupancy rate of the Bluetooth communication. Therefore, the electronic device 700 may prevent and/or reduce Bluetooth signal loss.

The communication module 720 may perform Bluetooth communication and Wi-Fi communication by using the first antenna 701 in common. For example, when a Wi-Fi signal and a Bluetooth signal are transmitted/received in the first band, the communication module 720 may control the first switching module 722 to sequentially connect the Bluetooth module 725 and the Wi-Fi module 723 with the first antenna 701.

Meanwhile, when the Bluetooth signal is transmitted/received in the first band and the Wi-Fi signal is transmitted/received in the second band, the communication module 720 may simultaneously perform Bluetooth communication and Wi-Fi communication through the first antenna 701. To this end, although not illustrated in FIG. 7A, the communication module 720 may include a signal separation device (for example, a duplexer, a diplexer, or a filter) for separating the first-band signal and the second-band signal between the first antenna 701 and the first switching module 722. For example, the first-band signal and the second-band signal simultaneously received through the first antenna 701 may be separated by the signal separation device (not shown), and the isolated first-band signal may be transmitted to the Bluetooth module 725 through the switching module 722 and the isolated second-band signal may be transmitted to the Wi-Fi module 723.

The communication module 720 according to various embodiments of the present disclosure may determine whether information related to the occupancy of the first antenna 701 by the Wi-Fi module 723 satisfies a predetermined condition. For example, the communication module 720 may, for example, determine whether the number of times of occupancy, the occupancy time, the time of use, the occupancy rate, or the time occupancy rate of the first antenna 701 by the Wi-Fi module 723 has increased to a particular value or larger. When the determined information on the occupancy satisfies the predetermined condition, the communication module 720 may designate (allocate or change) the first antenna 701 from the common antenna for supporting Bluetooth communication and Wi-Fi communication to a dedicated antenna for supporting only Wi-Fi communication. For example, the communication module 720 may control the first switching module 722 to connect the Wi-Fi module 723 with the first antenna 701 and control the third switching module 724 to connect the Bluetooth module 725 and the second antenna 702. At this time, the Wi-Fi module 723 may perform Wi-Fi communication through the first antenna 701 and the Bluetooth module 725 may perform Bluetooth communication through the second antenna 702.

When the second antenna 702 cannot be used (when a signal cannot be transmitted/received due to being held by the user) or when Wi-Fi communication stops, the communication module 720 may control the Bluetooth module 725 to use the first antenna 701.

According to some embodiments, when the determined information related to the occupancy satisfies the predetermined condition, the communication module 720 may change the frequency band of the Wi-Fi communication. For example, the communication module 720 may transmit/receive a Bluetooth signal in the first band through the first antenna 701 and transmit/receive a Wi-Fi signal in the second band through the first antenna 701. According to another embodiment, the communication module 720 may output (display) a popup window that asks about whether to change the frequency band of the Wi-Fi communication, and when the change in the frequency band is accepted by the user, perform the Wi-Fi communication in the second band. According to yet another embodiment, the communication module 720 may determine whether the strength of the Wi-Fi signal in the second band is higher than or equal to a preset value, and, when the strength is higher than or equal to the pre-set value, change the frequency band.

Meanwhile, although FIG. 7A illustrates that the Bluetooth module 725, the Wi-Fi module 723, and the switching module 722 are included in the communication module 720, at least some of the Bluetooth module 725, the Wi-Fi module 723, and the switching module 722 may be included outside the communication module 720 as separate elements in some embodiments.

Figure 8:
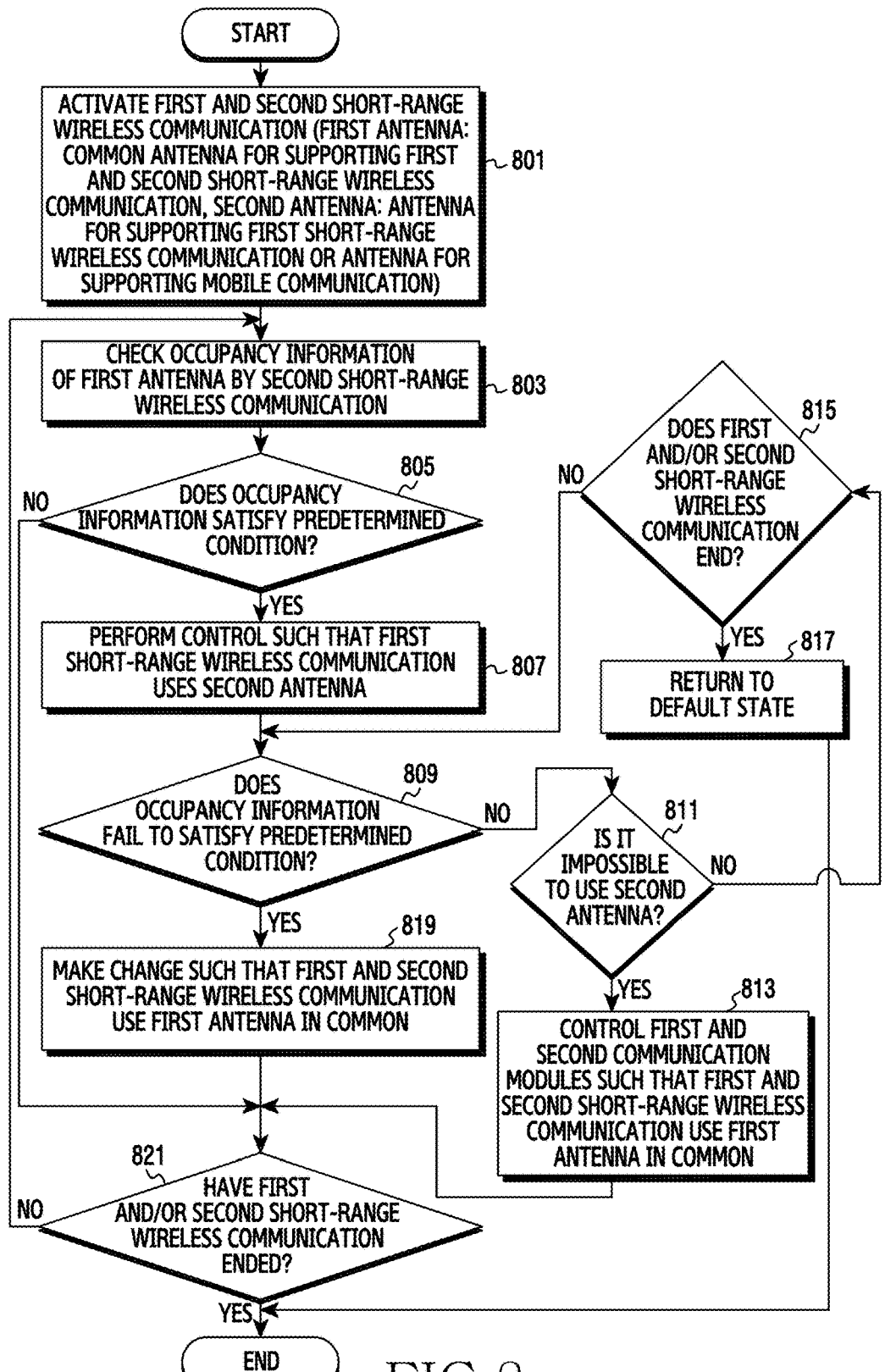
FIG. 8 is a flowchart illustrating an example procedure of controlling wireless communication of an electronic device according to an example embodiment of the present disclosure.

FIG. 8 is a flowchart illustrating an example procedure of controlling wireless communication of an electronic device according to an example embodiment of the present disclosure.

Referring to FIG. 8, a communication module (for example, the communication interface 170, the communication module 220, the communication module 620, or the communication module 720) of an electronic device (for example, the electronic device 101, the electronic device 201, the electronic device 600, or the electronic device 700) according to an embodiment of the present disclosure may activate first and second short-range wireless communication in operation 801. When the first and second short-range wireless communication is activated, the communication module may activate a first short-range wireless communication module (for example, the Bluetooth module 225, the Bluetooth module 625, or the Bluetooth module 725) and a second short-range wireless communication module (for example, the Wi-Fi module 223, the Wi-Fi module 623, or the Wi-Fi module 723). The electronic device may include a first antenna (for example, the first antenna 601 or the first antenna 701) for supporting the first and second short-range wireless communication and a second antenna (for example, the second antenna 602 or the second antenna 702) for supporting mobile communication or the second short-range wireless communication. According to some embodiments, the second antenna may be a GPS antenna or a diversity antenna for mobile communication.

In operation 803, the communication module according to an embodiment of the present disclosure may check occupancy information of the first antenna by the second short-range wireless communication (the number of times of occupancy, the occupancy time, the time of use, the occupancy rate, or the time occupancy rate).

In operation 805, the communication module according to an embodiment of the present disclosure may determine whether the occupancy information satisfies a predetermined condition. For example, the communication module may determine whether the number of times of occupancy, the occupancy time, the time of use, the occupancy rate, or the time occupancy rate of the first antenna by the second short-range wireless communication increases to a particular value or larger.

When the predetermined condition is not satisfied based on the result of the determination in operation 805, the communication module may perform operation 821 described below. On the other hand, when the predetermined condition is satisfied, the communication module may perform control such that the first short-range wireless communication is performed through the second antenna in operation 807. At this time, the second short-range wireless communication may be performed through the first antenna.

In operation 809, the communication module according to an embodiment of the present disclosure may determine whether the occupancy information fails to satisfy the predetermined condition. For example, the communication module may determine whether the number of times of occupancy, the occupancy time, the time of use, the occupancy rate, or the time occupancy rate of the first antenna by the second short-range wireless communication is reduced to be lower than the particular threshold.

When the occupancy information does not fail to satisfy the predetermined condition based on the result of the determination in operation 809, the communication module may determine whether it is impossible to use the second antenna in operation 811. For example, the communication module may determine whether the mobile communication module is making a request to use the second antenna. The communication module may determine whether the second antenna performance is lowered to a reference value or smaller due to being held by the user or signal interference.

When it is determined that the second antenna cannot be used based on the result of the determination in operation 811, the communication module may control the first and second short-range wireless communication modules to use the first antenna in common in operation 813 and proceed to operation 821. On the other hand, when it is determined that the second antenna can be used based on the result of the determination in operation 811, the communication module may determine whether first and/or second short-range wireless communication has ended (off) in operation 815. When the first and/or second short-range wireless communication is determined not to have ended (off) based on the result of the determination in operation 815, the communication module may return to operation 809 and repeat the above operations. On the other hand, when the first and/or second short-range wireless communication is determined to have ended (off) based on the result of the determination in operation 815, the communication module may return to a default state in operation 817. For example, the communication module may control the short-range wireless communication, which has not ended, to use the first antenna. In other words, the communication module may control the second short-range wireless communication to use the first antenna when the first short-range wireless communication ends, control the first short-range wireless communication to use the first antenna when the second short-range wireless communication ends, and deactivate the first and second short-range wireless communication modules when both the first and second short-range wireless communication end.

Meanwhile, when the predetermined condition is not satisfied (e.g., occupancy information fails to satisfy predetermined condition) based on the result of the determination in operation 809, the communication module may make a change such that both the first and second short-range wireless communication use the first antenna in common in operation 819.

According to some embodiments, the communication module may change the frequency band for Wi-Fi communication. For example, the communication module may transmit/receive a Bluetooth signal in the first band through the first antenna and transmit/receive a Wi-Fi signal in the second band through the first antenna (for example, when the second antenna cannot be used in FIG. 6) or through both the first antenna and the second antenna (for example, when the second antenna can be used in FIG. 6). According to another embodiment, the communication module may output (display) a popup window that asks whether to change the frequency band (for example, from the first band to the second band) for Wi-Fi communication, and, when the change in the frequency band is accepted by the user, control the Wi-Fi mobile to perform Wi-Fi communication in the second band. According to yet another embodiment, the communication module may determine whether the strength of the Wi-Fi signal in the second band is higher than or equal to a preset value, and, when the strength is higher than or equal to the pre-set value, change the frequency band.

In operation 821, the communication module according to an embodiment of the present disclosure may determine whether the first and/or second short-range wireless communication has ended (off). When the first and/or second short-range wireless communication is determined not to have ended (off) based on the result of the determination in operation 821, the communication module may return to operation 803 and repeat the above operations. On the other hand, when the first and/or second short-range wireless communication is determined to have ended (off) based on the result of the determination in operation 821, the communication module may end the wireless communication control procedure.

According to various example embodiments, the communication module may control the right to use the first antenna based on information related to the occupancy of the first antenna by the first short-range wireless communication (for example, the number of times of occupancy, the occupancy time, the time of use, the occupancy rate, or the time occupancy rate). According to various example embodiments, the communication module may control the right to use the first antenna based on data throughput (or amount of use) of the first short-range wireless communication module or the second short-range wireless communication module. Although it has been described that the communication module controls the right to use the first antenna, an application processor (not shown) or a communication processor (not shown) included in the electronic device may determine the number of times of occupancy, the occupancy time, the time of use, the occupancy rate, or the time occupancy rate of the first antenna by the second short-range wireless communication and control the right to use the first antenna based on the result of the determination.

Figure 9:
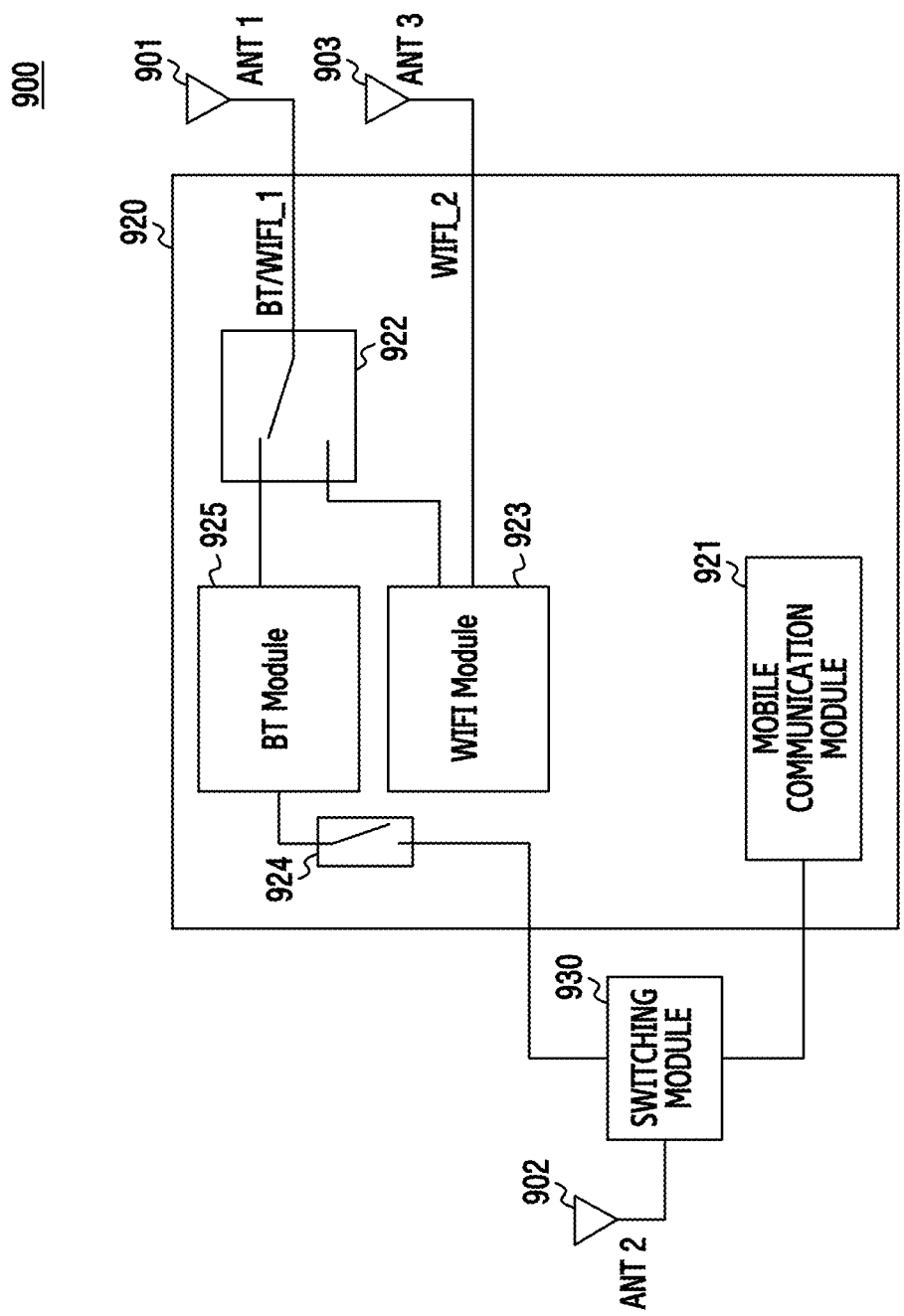
FIG. 9 is a block diagram illustrating an example configuration of an electronic device according to an example embodiment of the present disclosure.

FIG. 9 is a block diagram illustrating an example configuration of an electronic device according to an example embodiment of the present disclosure.

Referring to FIG. 9, an electronic device 900 according to an embodiment of the present disclosure may include, for example, all or some of the elements of the electronic device 101 illustrated in FIG. 1 or the electronic device 201 illustrated in FIG. 2.

The electronic device 900 according to an embodiment of the present disclosure may include a first antenna 901, a second antenna 902, a third antenna 903, a communication module (e.g., including communication circuitry) 920, and a third switching module (e.g., including switching circuitry) 930. The communication module 920 may include various communication, for example, and without limitation, a mobile communication module (e.g., including mobile communication circuitry) 921, a first switching module (e.g., including switching circuitry) 922, a Wi-Fi module (e.g., including Wi-Fi circuitry) 923, a second switching module (e.g., including switching circuitry) 924, and a Bluetooth module (e.g., including Bluetooth circuitry) 925.

The electronic device 900 according to an embodiment of the present disclosure may be in the form of a combination of the electronic device 400 of FIG. 4 and the electronic device 600 of FIG. 6. The electronic device 900 may operate similarly to the electronic device 400 of FIG. 4 and the electronic device 600 of FIG. 6. Accordingly, a detailed description of each element of the electronic device 900 will not be repeated here, and a description of a wireless communication control procedure of the electronic device 900 will be provided below with reference to FIG. 11.

Figure 10:
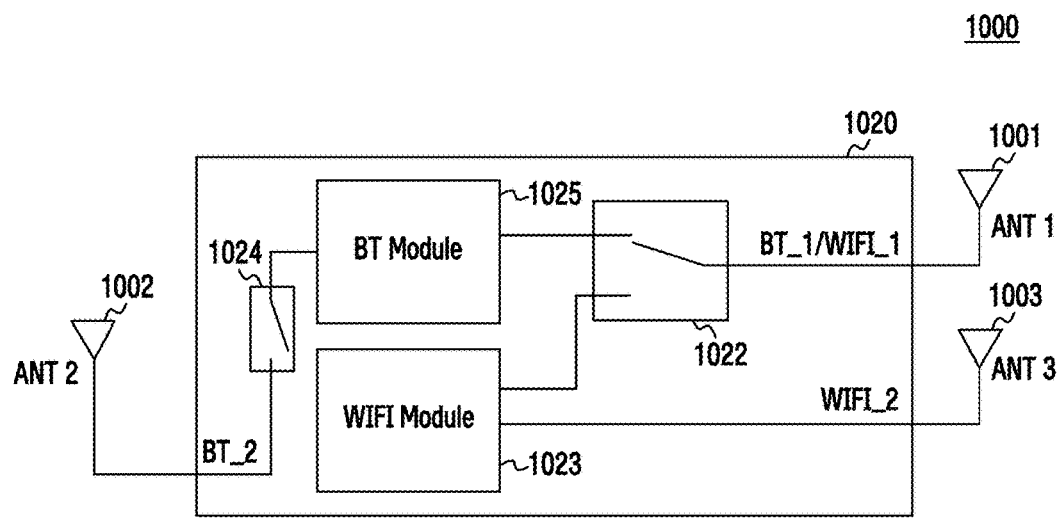
FIG. 10 is a block diagram illustrating an example configuration of an electronic device according to an example embodiment of the present disclosure.

FIG. 10 is a block diagram illustrating an example configuration of an electronic device according to an example embodiment of the present disclosure.

Referring to FIG. 10, an electronic device 1000 according to an embodiment of the present disclosure may include, for example, some or all of the elements of the electronic device 101 illustrated in FIG. 1 or the electronic device 201 illustrated in FIG. 2.

The electronic device 1000 according to an embodiment of the present disclosure may include a first antenna 1001, a second antenna 1002, a third antenna 1003, and a communication module (e.g., including communication circuitry) 1020. The communication module 1020 may include various communication circuitry, for example, and without limitation, a first switching module (e.g., including switching circuitry) 1022, a Wi-Fi module (e.g., including Wi-Fi circuitry) 1023, a second switching module (e.g., including switching circuitry) 1024, and a Bluetooth module (e.g., including Bluetooth circuitry) 1025.

The electronic device 1000 according to an embodiment of the present disclosure may be in the form of a combination of the electronic device 400 of FIG. 4 and the electronic device 700 of FIG. 7A. The electronic device 1000 may operate similarly to the electronic device 400 of FIG. 4 and the electronic device 700 of FIG. 7A. Accordingly, a detailed description of each element of the electronic device 1000 will not be repeated here, and a description of a wireless communication control procedure of the electronic device 1000 will be made below with reference to FIG. 11.

Figure 11:
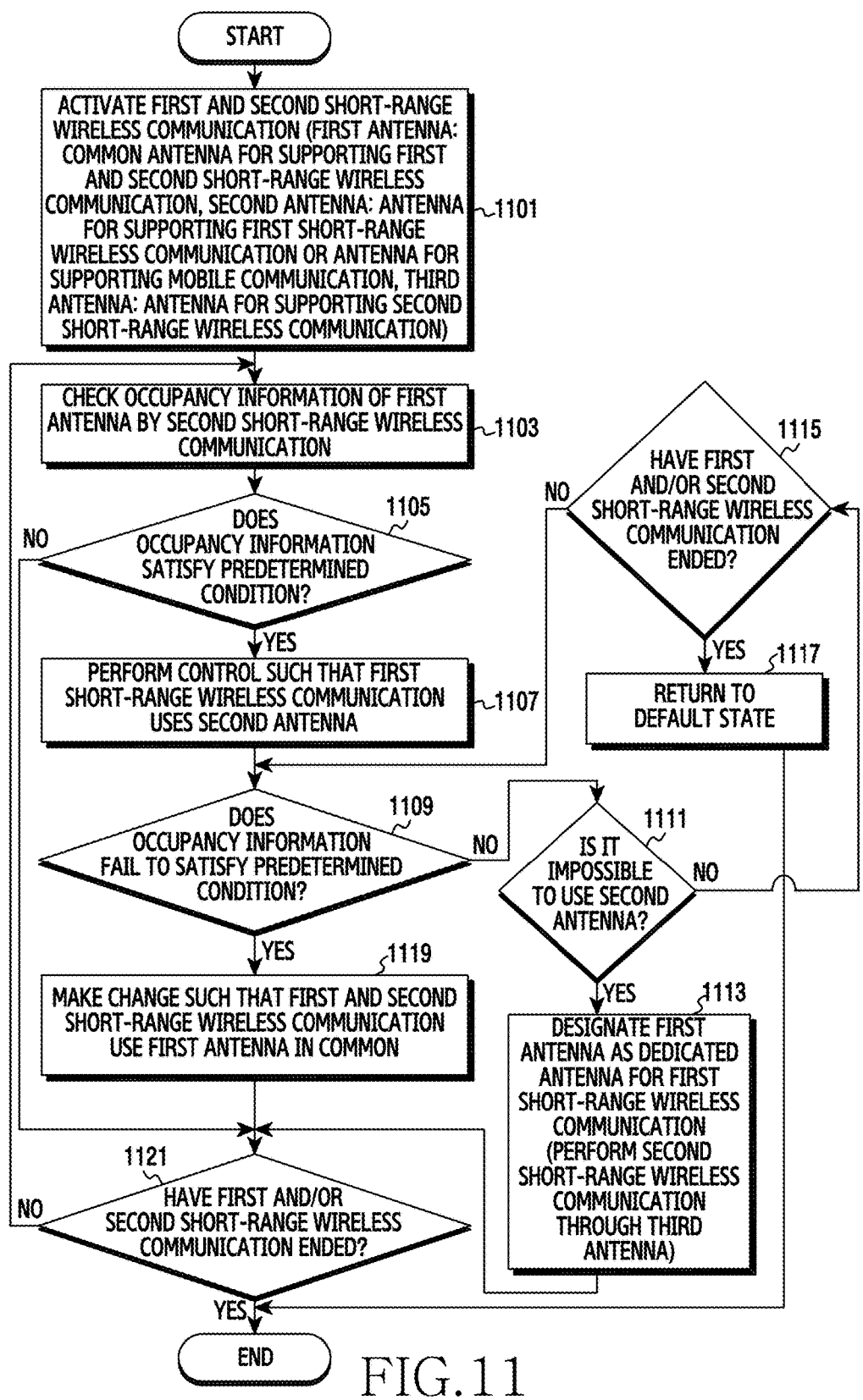
FIG. 11 is a flowchart illustrating an example method of controlling wireless communication of an electronic device according to an example embodiment of the present disclosure.

FIG. 11 is a flowchart illustrating an example method of controlling wireless communication of an electronic device according to an example embodiment of the present disclosure.

Referring to FIG. 11, a communication module (for example, the communication interface 170, the communication module 220, the communication module 920, or the communication module 1020) of an electronic device (for example, the electronic device 101, the electronic device 201, the electronic device 900, or the electronic device 1000) according to an example embodiment of the present disclosure may activate first and second short-range wireless communication in operation 1101. When the first and second short-range wireless communication is activated, a first short-range wireless communication module (for example, the Bluetooth module 925 or the Bluetooth module 1025) may transmit/receive a wireless signal through a first antenna (for example, the first antenna 901 or the first antenna 1001) and a second short-range wireless communication module (for example, the Wi-Fi module 923 or the Wi-Fi module 1023) may transmit/receive a wireless signal through the first antenna and a third antenna (for example, the third antenna 903 or the third antenna 1003). The electronic device may further include a second antenna (for example, the second antenna 902 or the second antenna 1002).

In operation 1103, the communication module according to an embodiment of the present disclosure may check occupancy information of the first antenna by the second short-range wireless communication (the number of times of occupancy, the occupancy time, the time of use, the occupancy rate, or the time occupancy rate).

In operation 1105, the communication module according to an embodiment of the present disclosure may determine whether the occupancy information satisfies a predetermined condition. For example, the communication module may determine whether the number of times of occupancy, the occupancy time, the time of use, the occupancy rate, or the time occupancy rate of the first antenna by the second short-range wireless communication increases to a particular value or larger.

When the predetermined condition is not satisfied based on the result of the determination in operation 1105, the communication module may perform operation 1121 described below. On the other hand, when the predetermined condition is satisfied, the communication module may perform control such that the first short-range wireless communication is performed through the second antenna in operation 1107. At this time, the second short-range wireless communication may be performed through the first antenna and the third antenna.

According to some embodiments, the communication module may change the frequency band for Wi-Fi communication. For example, the communication module may transmit/receive a Bluetooth signal in the first band through the first antenna and transmit/receive a Wi-Fi signal in the second band through the first antenna and the third antenna. According to another embodiment, the communication module may output (display) a popup window that asks whether to change the frequency band (for example, from the first band to the second band) for Wi-Fi communication, and, when the change in the frequency band is accepted by the user, control the Wi-Fi mobile to perform Wi-Fi communication in the second band. According to yet another embodiment, the communication module may determine whether the strength of the Wi-Fi signal in the second band is higher than or equal to a preset value, and, when the strength is higher than or equal to the pre-set value, change the frequency band.

In operation 1109, the communication module according to an embodiment of the present disclosure may determine whether the occupancy information fails to satisfy the predetermined condition. For example, the communication module may determine whether the number of times of occupancy, the occupancy time, the time of use, the occupancy rate, or the time occupancy rate of the first antenna by the second short-range wireless communication is reduced to be smaller than the particular value. According to some embodiments, the communication module may determine whether information related to the occupancy of the second antenna by the first short-range wireless communication satisfies a predetermined condition (second condition). For example, the second condition may be the value of data throughput of the Bluetooth module that can be processed even though the Bluetooth module uses the first antenna with the Wi-Fi module in common.

When the occupancy information does not fail to satisfy the predetermined condition based on the result of the determination in operation 1109, the communication module may determine whether it is impossible to use the second antenna in operation 1111. For example, the communication module may determine whether a mobile communication module (for example, the mobile communication module 921) makes a request to use the second antenna (for example, the second antenna 902). Alternatively, the communication module may determine whether the performance of a second antenna (for example, the second antenna 1002) is lowered to a reference value or smaller due to being held by the user or signal interference.

When it is determined that the second antenna cannot be used based on the result of the determination in operation 1111, the communication module may designate the first antenna as a dedicated antenna for first short-range wireless communication and perform control such that second short-range wireless communication is performed through the third antenna in operation 1113, and proceed to operation 1121.

On the other hand, when it is determined that the second antenna can be used based on the result of the determination in operation 1111, the communication module may determine whether first and/or second short-range wireless communication has ended (off) in operation 1115. When the first and/or second short-range wireless communication is determined not to have ended (off) based on the result of the determination in operation 1115, the communication module may return to operation 1109 and repeat the above operations. On the other hand, when it is determined that the first and/or second short-range wireless communication has ended (off) based on the result of the determination in operation 1115, the communication module may return to a default state in operation 1117. In other words, the communication module may return to an initial state in which the first and second short-range wireless communication use the first antenna in common and end the wireless communication control procedure. For example, when the first short-range wireless communication has ended, the communication module may control the second short-range wireless communication to use the first antenna and the third antenna. When the second short-range wireless communication has ended, the communication module may control the first short-range wireless communication to use the first antenna. When both the first and second short-range wireless communication have ended, the communication module may deactivate both the first and second short-range wireless communication modules.

Meanwhile, when the predetermined condition is not satisfied based on the result of the determination in operation 1109, the communication module may make a change such that the first and second short-range wireless communication use the first antenna in common in operation 1119.

In operation 1121, the communication module according to an embodiment of the present disclosure may determine whether the first and/or second short-range wireless communication has ended (off). When the first and/or second short-range wireless communication is determined not to have ended (off) based on the result of the determination in operation 1121, the communication module may return to operation 1103 and repeat the above operations. On the other hand, when it is determined that the first and/or second short-range wireless communication has ended (off) based on the result of the determination in operation 1121, the communication module may end the wireless communication control procedure.

According to various example embodiments, the communication module may control the right to use the first antenna based on information related to the occupancy of the first antenna by the first short-range wireless communication (for example, the number of times of occupancy, the occupancy time, the time of use, the occupancy rate, or the time occupancy rate). According to another example embodiment, the communication module may control the right to use the first antenna based on data throughput (or amount of use) of the first short-range wireless communication module or the second short-range wireless communication module.

Although it has been described that the communication module controls the right to use the first antenna, an application processor (not shown) or a communication processor (not shown) included in the electronic device may determine the number of times of occupancy, the occupancy time, the time of use, the occupancy rate, or the time occupancy rate of the first antenna by the second short-range wireless communication and control the right to use the first antenna based on the result of the determination.

Figure 12A:
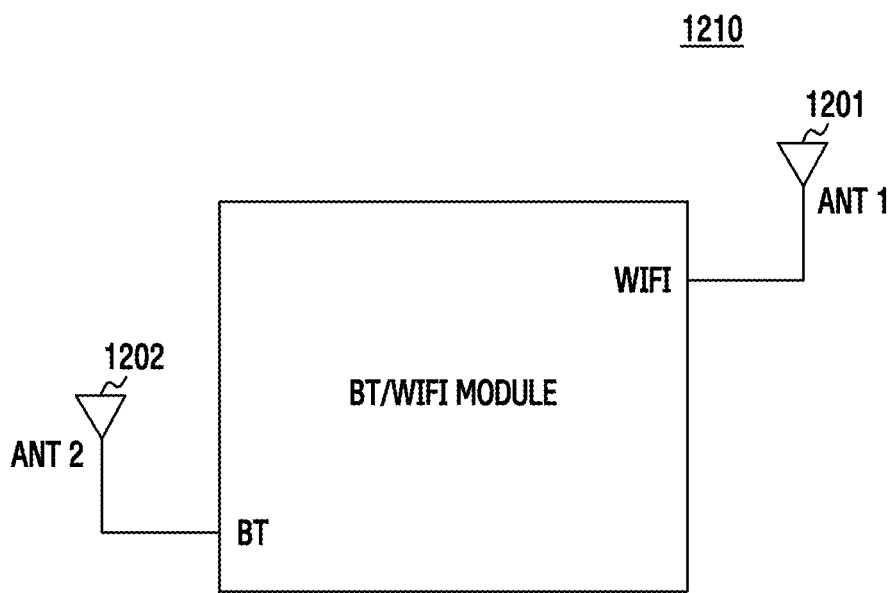
FIGS. 12A, 12B, and 12C are block diagrams illustrating example configurations of an electronic device according to an example embodiment of the present disclosure.
Figure 12B:
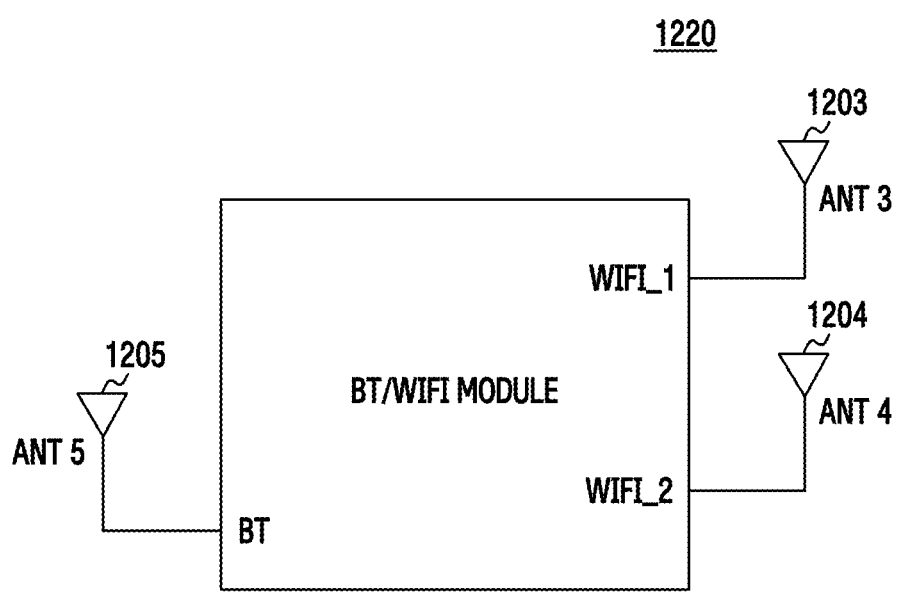
Figure 12C:
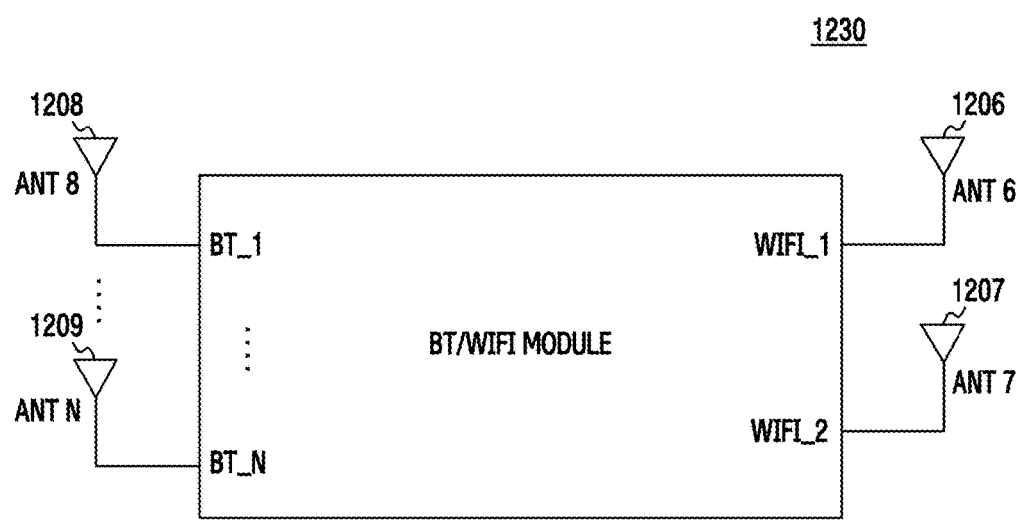

FIGS. 12A, 12B, and 12C are block diagrams illustrating example configurations of an electronic device according to an example embodiment of the present disclosure.

Referring to FIGS. 12A, 12B and 12C, electronic devices 1210, 1220, and 1230 according to various embodiments of the present disclosure may include a separate antenna for Bluetooth communication. For example, the first electronic device 1210 may include a first antenna 1201 for supporting second short-range wireless communication and a second antenna 1202 for supporting first short-range wireless communication. The second electronic device 1220 may include a third antenna 1203 and a fourth antenna 1204 for supporting second short-range wireless communication and a fifth antenna 1205 for supporting first short-range wireless communication. The third electronic device 1230 may include a sixth antenna 1206 and a seventh antenna 1207 for supporting second short-range wireless communication and a plurality of antennas 1208 and 1209 for supporting first short-range wireless communication.

The electronic devices 1210, 1220, and 1230 according to various embodiments of the present disclosure may be electronic devices having a mounting space to which a separate antenna for first short-range wireless communication can be mounted.

Meanwhile, the third electronic device 1230 including the plurality of antennas 1208 and 1209 for first short-range wireless communication may perform the first short-range wireless communication through the antenna having the best signal quality (strength) among the plurality of antennas 1208 and 1209. For example, when the signal quality deteriorates due to being held by the user while the first short-range wireless communication is performed through one of the plurality of antennas 1208 and 1209, the third electronic device 1230 may perform the first short-range wireless communication by switching to the antenna having the best signal quality among the remaining antennas.

FIG. 13 is a table illustrating the result of an experiment on the performance of wireless communication of an electronic device according to an example embodiment of the present disclosure.

Referring to FIG. 13, when a communication module includes two antennas and the conventional electronic device using one common antenna simultaneously operates through Wi-Fi and BLE, it is noted that Wi-Fi throughput is 127 Mbps (a reduction of 9%) and a BLE scan success rate is 9%. Further, when the conventional electronic device simultaneously operates through Wi-Fi, BLE, and Bluetooth (A2DP), it is noted that Wi-Fi throughput is 81 Mbps (a reduction of 42%) and a BLE scan success rate is just 2%.

On the other hand, when the electronic device (for example, the electronic device 1000 of FIG. 10) according to an embodiment of the present disclosure simultaneously operates through Wi-Fi and BLE, it is noted that Wi-Fi throughput is 138 Mbps (a reduction of 1%) and a BLE scan success rate is 47%. When the electronic device 1000 simultaneously operates through Wi-Fi, BLE, and Bluetooth (A2DP), it is noted that Wi-Fi throughput is 113 Mbps (a reduction of 19%) and a BLE scan success rate is 19%.

When the electronic device (for example, the electronic device 700 of FIG. 7A) according to an embodiment of the present disclosure simultaneously operates through Wi-Fi and BLE, it is noted that Wi-Fi throughput is 70 Mbps (a reduction of 50%) and a BLE scan success rate is 47%. When the electronic device 700 simultaneously operates through Wi-Fi, BLE, and Bluetooth (A2DP), it is noted that Wi-Fi throughput is 70 Mbps (a reduction of 50%) and a BLE scan success rate is 19%. As described above, it is noted that the electronic devices according to various embodiments of the present disclosure improve the BLE scan success rate.

According to various example embodiments of the present disclosure, an electronic device may comprise a first antenna configured to support first short-range wireless communication and second short-range wireless communication; a second antenna; and a processor, wherein the processor is configured to determine information related to occupancy of the first antenna by the second short-range wireless communication, to change the first antenna to an antenna performing the first short-range wireless communication from an antenna for supporting the first short-range wireless communication and the second short-range wireless communication when the information related to the occupancy satisfies a predetermined condition, to perform the first short-range wireless communication through the first antenna, and to perform the second short-range wireless communication through the second antenna.

According to various example embodiments, the information may include a number of times of occupancy, an occupancy time, a time of use, an occupancy rate, or a time occupancy rate.

According to various example embodiments, the first short-range wireless communication may be Bluetooth and the second short-range wireless communication may be Wi-Fi.

According to various example embodiments of the present disclosure, an electronic device may comprise a first antenna configured to support first short-range wireless communication and second short-range wireless communication; a second antenna; and a processor, wherein the processor is configured to: determine information related to occupancy of the first antenna by the first short-range wireless communication or the second short-range wireless communication, simultaneously or sequentially perform the first short-range wireless communication and the second short-range wireless communication through the first antenna when the information related to the occupancy satisfies a predetermined condition, and perform one short-range wireless communication selected from the first short-range wireless communication and the second short-range wireless communication through the second antenna and perform the other short-range wireless communication through the first antenna when the information related to the occupancy satisfies another predetermined condition.

According to various example embodiments, the information may include a number of times of occupancy, an occupancy time, a time of use, an occupancy rate, or a time occupancy rate.

According to various example embodiments, the first short-range wireless communication may be Bluetooth and the second short-range wireless communication may be Wi-Fi.

According to various example embodiments, the second antenna may be an antenna configured to support the second short-range wireless communication, and the processor may perform the first short-range wireless communication through the first antenna and the second short-range wireless communication through the second antenna.

According to various example embodiments, the second antenna may be one of a main antenna for mobile communication, an auxiliary antenna for supporting diversity, a GPS antenna, and at least one antenna for supporting the first short-range wireless communication, and the processor may perform the first short-range wireless communication through the second antenna and the second short-range wireless communication through the first antenna.

According to various example embodiments, the electronic device may comprise a third antenna for supporting multiple-input-multiple-output of the second short-range wireless communication, wherein the processor may perform the first short-range wireless communication through the first antenna and the second short-range wireless communication through the third antenna when the second antenna cannot be used.

According to various example embodiments, the Wi-Fi can communicate in a first band or a second band, and the processor may change a frequency band for Wi-Fi communication to the second band when the other predetermined condition is satisfied while the Wi-Fi communication is performed in the first band.

According to various example embodiments, when a number of at least one antenna for supporting the first short-range wireless communication is plural, the processor may perform the second short-range wireless communication through an antenna having a largest received signal strength.

According to various example embodiments of the present disclosure, a method of controlling wireless communication by an electronic device comprising a first antenna and a second antenna for supporting first short-range wireless communication and second short-range wireless communication may comprise: determining information related to occupancy of the first antenna by the second short-range wireless communication, designating the first antenna as an antenna for performing the first short-range wireless communication from an antenna for supporting the first short-range wireless communication and the second short-range wireless communication when the information related to the occupancy satisfies a predetermined condition, performing the first short-range wireless communication through the first antenna, and performing the second short-range wireless communication through the second antenna.

According to various example embodiments of the present disclosure, a method of controlling wireless communication by an electronic device comprising a first antenna and a second antenna for supporting first short-range wireless communication and second short-range wireless communication may comprise: determining information related to occupancy of the first antenna by the first short-range wireless communication or the second short-range wireless communication; simultaneously or sequentially performing the first short-range wireless communication and the second short-range wireless communication through the first antenna when the information related to the occupancy satisfies a predetermined condition; and performing one short-range wireless communication selected from between the first short-range wireless communication and the second short-range wireless communication through the second antenna and performing the other short-range wireless communication through the first antenna when the information related to the occupancy satisfies another predetermined condition.

According to various example embodiments, the information may include a number of times of occupancy, an occupancy time, a time of use, an occupancy rate, or a time occupancy rate.

According to various example embodiments, the first short-range wireless communication may be Bluetooth and the second short-range wireless communication may be Wi-Fi.

According to various example embodiments, the second antenna may be an antenna for supporting the second short-range wireless communication, and the performing of the one short-range wireless communication selected from between the first short-range wireless communication and the second short-range wireless communication through the second antenna and the performing of the other short-range wireless communication through the first antenna may comprise performing the first short-range wireless communication through the first antenna and performing the second short-range wireless communication through the second antenna.

According to various example embodiments, the second antenna may be one of a main antenna for mobile communication, an auxiliary antenna for supporting diversity, a GPS antenna, and the performing of the one short-range wireless communication selected from between the first short-range wireless communication and the second short-range wireless communication through the second antenna and the performing of the other short-range wireless communication through the first antenna may comprise performing the first short-range wireless communication through the second antenna and performing the second short-range wireless communication through the first antenna.

According to various example embodiments, the electronic device further comprises a third antenna for supporting multiple-input-multiple-output of the second short-range wireless communication, the method further comprises: detecting that the second antenna cannot be used; and performing the first short-range wireless communication through the first antenna and performing the second short-range wireless communication through the third antenna in response to the detection.

According to various example embodiments, the Wi-Fi can communicate in a first band or a second band, the method further comprises changing a frequency band for Wi-Fi communication to the second band when the other predetermined condition is satisfied while the Wi-Fi communication is performed in the first band.

According to various example embodiments, the changing of the frequency band for the Wi-Fi communication to the second band may comprise: outputting a popup window that asks whether to change the frequency band and determining whether to change the frequency band according to a user selection; or changing the frequency band when a strength of a Wi-Fi signal in the second band is higher than or equal to a preset value.

According to various example embodiments, the method further comprises, when a number of at least one antenna for supporting the first short-range wireless communication is plural, performing the second short-range wireless communication through an antenna having a largest received signal strength.

According to various example embodiments of the present disclosure, it is possible to efficiently control wireless communication of the electronic device. For example, according to various embodiments of the present disclosure, when information on the occupancy of the first antenna for supporting a plurality of kinds of wireless communication (the number of times of occupancy, the occupancy time, the time of use, the occupancy rate, or the time occupancy rate) satisfies a reference condition, a plurality of communication modules may be controlled to use different antennas, and thus signal loss may be prevented and/or reduced. According to various embodiments of the present disclosure, the perceived reliability of the electronic device can be improved by preventing and/or reducing signal loss.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include, for example, and without limitation, at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Various example embodiments disclosed herein are provided merely to easily describe technical details of the present disclosure and to aid in the understanding of the present disclosure, and are not intended to limit the scope of the present disclosure. Accordingly, the scope of the present disclosure should be understood to include all modifications or various other embodiments based on the technical idea of the present disclosure.

What is claimed is:

1. An electronic device comprising:
   a first antenna configured to support first short-range wireless communication and second short-range wireless communication, wherein the first short-range wireless communication is a different protocol than is the second short-range wireless communication;
   a second antenna; and
   a processor,
   wherein the processor is configured to:
      while performing the first short-range wireless communication and the second short-range wireless communication through the first antenna, determine information related to occupancy of the first antenna by the second short-range wireless communication,
      in response to determining that the information related to the occupancy satisfies a predetermined condition, maintain the performing the first short-range wireless communication and the second short-range wireless communication through the first antenna, and
      in response to determining that the information related to the occupancy satisfies another predetermined condition, change the first antenna to an antenna for performing the first short-range wireless communication from an antenna for supporting the first short-range wireless communication and the second short-range wireless communication, perform the first short-range wireless communication through the first antenna, and perform the second short-range wireless communication through the second antenna.

2. The electronic device of claim 1, wherein the information includes a number of times of occupancy, an occupancy time, a time of use, an occupancy rate, and/or a time occupancy rate.

3. The electronic device of claim 1, wherein the first short-range wireless communication comprises Bluetooth and the second short-range wireless communication comprises Wi-Fi.

4. An electronic device comprising:
   a first antenna configured to support first short-range wireless communication and second short-range wireless communication, wherein the first short-range wireless communication is a different protocol than is the second short-range wireless communication;
   a second antenna; and
   a processor, wherein the processor is configured to:
      while simultaneously or sequentially performing the first short-range wireless communication and the second short-range wireless communication through the first antenna, determine information related to occupancy of the first antenna by the first short-range wireless communication and/or the second short-range wireless communication,
      in response to determining that the information related to the occupancy satisfies a predetermined condition, maintain the performing the first short-range wireless communication and the second short-range wireless communication through the first antenna, and in response to determining that the information related to the occupancy satisfies another predetermined condition, perform one short-range wireless communication selected from the first short-range wireless communication and the second short-range wireless communication through the second antenna, and perform the other short-range wireless communication through the first antenna.

5. The electronic device of claim 4, wherein the information includes a number of times of occupancy, an occupancy time, a time of use, an occupancy rate, and/or a time occupancy rate.

6. The electronic device of claim 4, wherein the first short-range wireless communication comprises Bluetooth and the second short-range wireless communication comprises Wi-Fi.

7. The electronic device of claim 4, wherein the second antenna is an antenna configured to support the second short-range wireless communication, and the processor is configured to perform the first short-range wireless communication through the first antenna and the second short-range wireless communication through the second antenna.

8. The electronic device of claim 4, wherein the second antenna is one of a main antenna for mobile communication, an auxiliary antenna for supporting diversity, a GPS antenna, and at least one antenna for supporting the first short-range wireless communication, and the processor is configured to perform the first short-range wireless communication through the second antenna and the second short-range wireless communication through the first antenna.

9. The electronic device of claim 8, further comprising a third antenna configured to support multiple-input-multiple-output of the second short-range wireless communication, wherein the processor is configured to perform the first short-range wireless communication through the first antenna and the second short-range wireless communication through the third antenna when the second antenna cannot be used.

10. The electronic device of claim 6, wherein the Wi-Fi is configured to communicate in a first band or a second band, and the processor is configured to change a frequency band for Wi-Fi communication to the second band when the another predetermined condition is satisfied while the Wi-Fi communication is performed in the first band.

11. The electronic device of claim 8, wherein, when a number of at least one antenna configured to support the first short-range wireless communication is plural, the processor is configured to perform the second short-range wireless communication through an antenna having a largest received signal strength from among the plural antennas supporting the first short-range wireless communication.

12. A method of controlling wireless communication by an electronic device comprising a first antenna and a second antenna configured to support first short-range wireless communication and second short-range wireless communication, wherein the first short-range wireless communication is a different protocol than is the second short-range wireless communication, the method comprising:

while simultaneously or sequentially performing the first short-range wireless communication and the second short-range wireless communication through the first antenna, determining information related to occupancy of the first antenna by the first short-range wireless communication or the second short-range wireless communication;

in response to determining that the information related to the occupancy satisfies a predetermined condition, maintaining the simultaneously or sequentially performing the first short-range wireless communication and the second short-range wireless communication through the first antenna; and in response to determining that the information related to the occupancy satisfies another predetermined condition, performing one short-range wireless communication selected from the first short-range wireless communication and the second short-range wireless communication through the second antenna, and performing the other short-range wireless communication through the first antenna.

13. The method of claim 12, wherein the information includes a number of times of occupancy, an occupancy time, a time of use, an occupancy rate, and/or a time occupancy rate.

14. The method of claim 12, wherein the first short-range wireless communication comprises Bluetooth and the second short-range wireless communication comprises Wi-Fi.

15. The method of claim 12, wherein the second antenna is an antenna configured to support the second short-range wireless communication, and the performing of the one short-range wireless communication selected from the first short-range wireless communication and the second short-range wireless communication through the second antenna and the performing of the other short-range wireless communication through the first antenna comprises performing the first short-range wireless communication through the first antenna and performing the second short-range wireless communication through the second antenna.

16. The method of claim 12, wherein the second antenna is one of a main antenna for mobile communication, an auxiliary antenna for supporting diversity, and a GPS antenna, and the performing of the one short-range wireless communication selected from the first short-range wireless communication and the second short-range wireless communication through the second antenna and the performing of the other short-range wireless communication through the first antenna comprises performing the first short-range wireless communication through the second antenna and performing the second short-range wireless communication through the first antenna.

17. The method of claim 16, wherein the electronic device further comprises a third antenna configured to support multiple-input-multiple-output of the second short-range wireless communication, the method further comprising:

determining whether the second antenna cannot be used; and performing the first short-range wireless communication through the first antenna and performing the second short-range wireless communication through the third antenna based on the determination.

18. The method of claim 14, wherein the Wi-Fi is configured to communicate in a first band or a second band, the method further comprising changing a frequency band for Wi-Fi communication to the second band when the another predetermined condition is satisfied while the Wi-Fi communication is performed in the first band.

19. The method of claim 18, wherein the changing of the frequency band for the Wi-Fi communication to the second band comprises:

outputting a popup window that asks whether to change the frequency band and determining whether to change the frequency band according to a user selection; or changing the frequency band when a strength of a Wi-Fi signal in the second band is greater than or equal to a preset value.

20. The method of claim 16, further comprising, when a number of at least one antenna for supporting the first short-range wireless communication is plural, performing the second short-range wireless communication through an antenna having a largest received signal strength among the plural antennas supporting the first short-range wireless communication.

* * * * *